(12) United States Patent
Chen

(10) Patent No.: US 12,159,149 B2
(45) Date of Patent: Dec. 3, 2024

(54) TERMINAL DEVICE, GESTURE OPERATION METHOD THEREOF, AND MEDIUM

(71) Applicant: Petal Cloud Technology Co., Ltd., Dongguan (CN)

(72) Inventor: Chuanfeng Chen, Shenzhen (CN)

(73) Assignee: PETAL CLOUD TECHNOLOGIES CO., LTD., Dongguan (CN)

( * ) Notice: Subject to any disclaimer, the term of this patent is extended or adjusted under 35 U.S.C. 154(b) by 0 days.

(21) Appl. No.: 18/002,373

(22) PCT Filed: Jun. 15, 2021

(86) PCT No.: PCT/CN2021/100061
§ 371 (c)(1),
(2) Date: Dec. 19, 2022

(87) PCT Pub. No.: WO2021/254318
PCT Pub. Date: Dec. 23, 2021

(65) Prior Publication Data
US 2023/0229462 A1    Jul. 20, 2023

(30) Foreign Application Priority Data
Jun. 18, 2020   (CN) .......................... 202010560016.3

(51) Int. Cl.
*G06F 9/451*    (2018.01)
*G06F 3/0488*   (2022.01)

(52) U.S. Cl.
CPC .......... *G06F 9/451* (2018.02); *G06F 3/0488* (2013.01)

(58) Field of Classification Search
CPC ......... G06F 3/0488; G06F 9/451; G06F 3/017
See application file for complete search history.

(56) References Cited

U.S. PATENT DOCUMENTS

| | | |
|---|---|---|
| 2013/0106707 A1 | 5/2013 | Chen |
| 2013/0147850 A1 | 6/2013 | Li et al. |
| 2014/0282272 A1 | 9/2014 | Kies et al. |
| 2015/0019459 A1 | 1/2015 | Han |
| 2015/0195163 A1 | 7/2015 | Grover |
| 2016/0062468 A1* | 3/2016 | Livshits ................. G06F 3/011 345/156 |
| 2016/0071341 A1* | 3/2016 | Menzel .................. G16Z 99/00 340/5.61 |

(Continued)

FOREIGN PATENT DOCUMENTS

| | | |
|---|---|---|
| CN | 103455496 A | 12/2013 |
| CN | 103576966 A | 2/2014 |

(Continued)

*Primary Examiner* — Matthew A Eason
*Assistant Examiner* — Chayce R Bibbee
(74) *Attorney, Agent, or Firm* — Conley Rose, P.C.

(57) ABSTRACT

A gesture operation method includes a terminal device that starts an application. When a conflict exists between a gesture supported by the application and a default gesture of an operating system of the terminal device, the terminal device enables a standby gesture for the conflicted default gesture of the operating system such that a user can use different functions defined by the operating system and the application for the conflicted gesture.

20 Claims, 20 Drawing Sheets

(56) References Cited

U.S. PATENT DOCUMENTS

| | | | | |
|---|---|---|---|---|
| 2016/0188181 A1* | 6/2016 | Smith | ............... | G06F 3/04845 |
| | | | | 715/765 |
| 2017/0255320 A1* | 9/2017 | Kumar | ............... | G06F 3/04883 |
| 2021/0103914 A1* | 4/2021 | Pinniboyina | .......... | G07F 7/0813 |

FOREIGN PATENT DOCUMENTS

| | | |
|---|---|---|
| CN | 104760548 A | 7/2015 |
| CN | 105260117 A | 1/2016 |
| CN | 105573644 A | 5/2016 |
| CN | 105589698 A | 5/2016 |
| CN | 105760102 A | 7/2016 |
| CN | 107728898 A | 2/2018 |
| CN | 109144392 A | 1/2019 |
| CN | 109933199 A | 6/2019 |
| WO | 2016033261 A1 | 3/2016 |

* cited by examiner

TERMINAL DEVICE, GESTURE OPERATION METHOD THEREOF, AND MEDIUM

CROSS-REFERENCE TO RELATED APPLICATIONS

This is a U.S. National Stage of International Patent Application No. PCT/CN2021/100061 filed on Jun. 15, 2021, which claims priority to Chinese Patent Application No. 202010560016.3 filed on Jun. 18, 2020. Both of the aforementioned applications are hereby incorporated by reference in their entireties.

TECHNICAL FIELD

This application relates to the terminal field, and more specifically, to a terminal device, a gesture operation method thereof, and a medium,

BACKGROUND

In a device (for example, a smartphone or a tablet computer) that performs interaction in a touch manner or the like, both an operating system (operating system, OS) of the device and an application (Application, APP) running on the operating system support some gesture operations, and various functions are defined for different gestures. However, a conflict may occur between gestures supported by the OS and the app. To be specific, the OS and the app support a same gesture, but a function corresponding to the gesture in the OS is different from a function corresponding to the gesture in the app.

Currently, a main manner of resolving a gesture conflict problem is as follows: After a user provides a conflicted gesture in an app, at least two functions corresponding to the gesture are obtained, one of the at least two functions is determined to perform responding, and another function corresponding to the gesture is set to be invalid (that is, shielded). In this way, the gesture conflict problem is resolved. For example, in some reading apps, a conflict exists between a gesture of the app and a gesture of the OS. For example, a gesture "slide left from the right edge" in the reading app corresponds to a "page turning" function, but the gesture conflicts with a gesture corresponding to a "back" function in the OS. In the conventional technology, to resolve the gesture conflict problem, after the gesture "slide left from the right edge" of the user is detected, the "page turning" function is performed, and the "back" function is shielded.

However, this policy of selecting only one of a plurality of functions corresponding to a conflicted gesture to perform responding when the gesture conflict occurs has specific limitations. In a gesture conflict scenario, the user may have requirements for different functions. However, in this solution, some response policies are shielded. As a result, the user cannot use these shielded functions.

SUMMARY

An objective of this application is to provide a terminal device, a gesture operation method thereof, and a medium, so that in a scenario in which a conflict exists between gestures supported by an OS and an app, a user can still use different functions of the gestures defined by the OS and the app.

A first aspect of this application provides a gesture operation method, including: A terminal device starts an application. When a conflict exists between a gesture supported by the application and a default gesture of an operating system of the terminal device, the terminal device enables a standby gesture of the conflicted default gesture of the operating system. In this way, when detecting the conflicted gesture, the terminal device executes a corresponding function of the application, and when detecting the standby gesture, the terminal device executes a function corresponding to the operating system, to resolve a gesture conflict problem between the application and the operating system.

In a possible implementation of the first aspect, the method further includes: The terminal device determines that the conflict exists between the gesture supported by the started application and the default gesture of the operating system of the terminal device.

In a possible implementation of the first aspect, when the gesture supported by the application is known, the terminal device may determine, by obtaining the gesture supported by the application and comparing the gesture with the default gesture of the operating system, whether the conflict exists. For example, when a gesture the same as the default gesture of the operating system exists in the obtained gesture supported by the application, the terminal device determines that the conflict exists.

In a possible implementation of the first aspect, when the gesture supported by the application is unknown, the terminal device may determine, by monitoring a gesture operation event, whether the gesture conflict exists between the application and the operating system. For example, the terminal device respectively sets a pre-monitor and a post-monitor of the gesture operation event before and after the application. When it is detected that a gesture in the gesture operation event in the pre-monitor is the default gesture of the operating system but no default gesture is detected in the post-monitor, the conflict exists between the default gesture that is of the operating system and that is detected in the pre-monitor and the gesture supported by the application.

In a possible implementation of the first aspect, a server may further determine whether the conflict exists between the application and the operating system on the terminal device. For example, the server may obtain gesture information of the gesture supported by the application of the terminal device and the default gesture supported by the operating system of the terminal device, and determine whether a same gesture exists in the gesture supported by the application and the default gesture supported by the operating system of the terminal device. When the same gesture exists, it is determined that a gesture conflict exists between the gesture supported by the application and the default gesture of the operating system of the terminal device. Then, the terminal device obtains a gesture determining result from the server.

In a possible implementation of the first aspect, the method further includes: Before starting the application, the terminal device sets the standby gesture for the conflicted default gesture of the operating system, or prompts the user to set the standby gesture for the conflicted default gesture.

To be specific, in this embodiment of this application, one standby gesture may be preset for all or some of default gestures of the operating system of the terminal device, and when it is detected that a conflict exists between the gesture supported by the application and the default gesture of the OS of the terminal device, the standby gesture of the conflicted default gesture is directly enabled.

In a possible implementation of the first aspect, the method further includes: After starting the application, the terminal device sets the standby gesture for the conflicted default gesture of the operating system, or prompts the user to set the standby gesture for the conflicted default gesture.

To be specific, in this embodiment of this application, after the application is started, when the conflict exists between the default gesture of the operating system of the terminal device and the gesture supported by the application, the terminal device may enable the standby gesture corresponding to the default gesture, or prompt, in a man-machine interaction interface of the application, the user to set the standby gesture for the conflicted default gesture.

In a possible implementation of the first aspect, because the terminal device cannot completely detect all gestures supported by the application, when the terminal device detects the gestures supported by the application, the terminal device may further obtain, from a server, gestures that are supported by a same application and that is detected by another terminal device, and stores the gestures supported by the application.

In a possible implementation of the first aspect, the method further includes: After detecting exit of the application, the terminal device disables the standby gesture.

In a possible implementation of the first aspect, the method further includes: when enabling or disabling the standby gesture, the terminal device prompts a user that the standby gesture is enabled or disabled. For example, the terminal device may notify, by displaying notification information in a notification bar, the user that the standby gesture is enabled or disabled, or notify, by popping up a window or displaying a text, an animation, or an image on a blurred background, the user that the standby gesture is enabled or disabled.

In a possible implementation of the first aspect, when the user inputs the gesture that is supported by the application and that conflicts with the default gesture of the operating system, the terminal device executes an operation corresponding to the gesture of the application. To be specific, the terminal device detects a first input of the user on the application. The first input corresponds to the gesture that is supported by the application and that conflicts with the default gesture of the operating system. The terminal device executes the operation corresponding to the gesture supported by the application.

In a possible implementation of the first aspect, when the user inputs the standby gesture corresponding to the default gesture of the operating system, the terminal device performs an operation corresponding to the standby gesture of the operating system or the conflicted default gesture. To be specific, the terminal device detects a second input of the user on the application. The second input corresponds to the enabled standby gesture. The terminal device performs the operation corresponding to the standby gesture.

A second aspect of this application provides a readable medium of a terminal device. The readable medium stores instructions, and when the instructions are run by the terminal device, the terminal device performs the gesture operation method provided in the first aspect.

A third aspect of this application provides a terminal device, including:

a memory, where the memory stores instructions; and a processor, configured to read and execute the instructions in the memory, so that the terminal device performs the gesture operation method provided in the first aspect.

DESCRIPTION OF EMBODIMENTS

Figure 1:
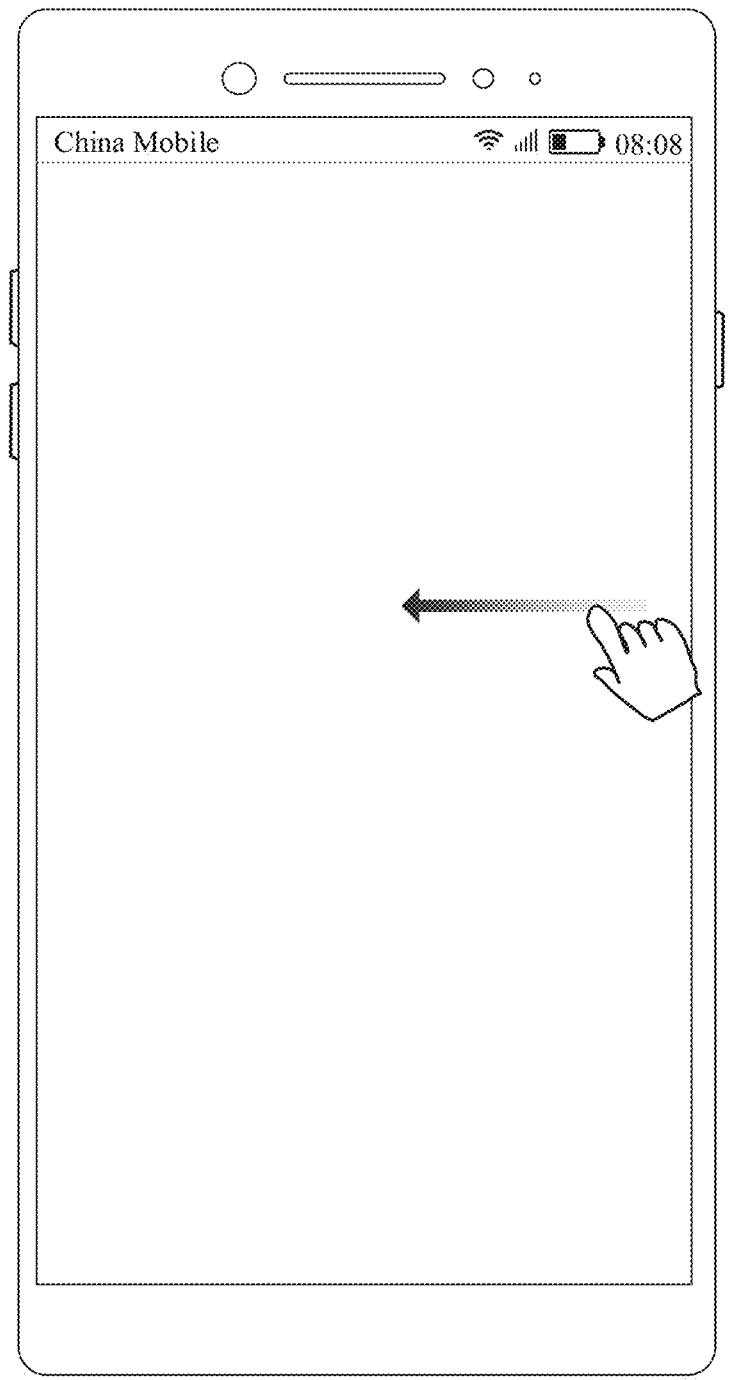
FIG. 1 shows an example of performing a gesture operation on a device according to an embodiment of this application.

The following further describes this application with reference to specific embodiments and the accompanying drawings. It may be understood that the specific embodiments described herein are merely intended to explain this application, but not to limit this application. In addition, for ease of description, the accompanying drawings show only some but not all structures or processes related to this application. It should be noted that in this specification, similar reference numerals and letters represent similar items in the following figures.

The illustrative embodiments of this application include but are not limited to a terminal device, and a gesture operation method thereof, a medium, and the like.

With development of smart devices, interaction with the smart devices by using gestures becomes increasingly widespread. Devices that support gesture interaction include but are not limited to a touchscreen mobile phone, a tablet computer, a somatic game machine, and the like. In various devices such as a mobile phone that perform interaction by using gestures, both an operating system (operating system, OS) (for example, IOS®, Android®, and Microsoft) and an application (Application, APP) running on the operating system support some gestures (for example, sliding left, sliding right, and pulling down), and a corresponding function is defined for each gesture. Common examples are as follows: "Slide left" corresponds to "back", "pull down" corresponds to "display a menu", "slide up" corresponds to "return to a home screen", and the like. However, in some cases, a conflict between gestures supported by the OS and the app may occur. To be specific, the OS and the app support a same gesture, but a definition of a function corresponding to the gesture in the OS is different from a definition of a function corresponding to the gesture in the app. For example, as shown in FIG. 1, in a mobile phone, both an OS and a reading app may support a gesture "slide left from the right edge". However, a function defined in the OS for "slide left from a right edge" may be "back", a function defined in the reading app is "page turning".

When a gesture conflict occurs between the OS and the app, if only one function is selected to perform responding, user requirements for different functions cannot be met. Therefore, embodiments provided in this application are intended to enable, in a scenario in which a conflict exists between gestures supported by an OS and an app, a user can still use functions supported by the OS and the app to perform responding.

With reference to FIG. 2 to FIG. 21, the following describes in detail gesture operation methods provided in some embodiments of this application. In the accompanying drawings of this application, a reference numeral that is followed by a letter, for example, "100a", indicates a reference to an element with the particular reference numeral, and a reference numeral that is not followed by a letter, for example, "100", indicates a general reference to an implementation of an element with the reference numeral.

Figure 2:
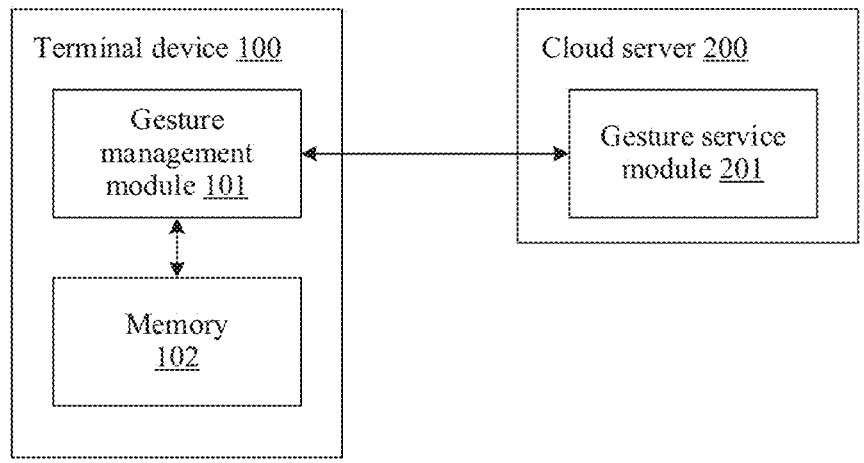
FIG. 2 shows an example of a gesture conflict resolution system according to an embodiment of this application.

FIG. 2 shows a gesture conflict resolution system 10 according to an embodiment of this application. As shown in FIG. 2, the system 10 includes a terminal device 100 and a cloud server 200.

The terminal device 100 includes a gesture management module 101 and a memory 102. The gesture management module 101 of the terminal device 100 runs on the terminal device 100, and may be implemented by hardware, or may be implemented by hardware executing corresponding software. The gesture management module 101 may be configured to detect and process a gesture conflict. Specifically, the gesture management module 101 has at least one of the following functions.

(1) The gesture management module 101 may detect and collect gesture information of an app running or installed on the terminal device 100 in a process of using the terminal device 100, and store the gesture information of the app running or installed on the terminal device 100 in the local memory 102 and/or send the gesture information to the cloud server 200.

(2) The gesture management module 101 may obtain, from the cloud server 200, gesture information that is supported by the app and that is not detected by the terminal device 100. The gesture information may be detected by another terminal device that is connected to the cloud server 200 and on which the same app is installed and run.

It may be understood that, in some embodiments, because the gesture management module 101 on the single terminal device 100 cannot detect all gesture information of the APP running or installed on the terminal device 100, the gesture management module 101 further needs to receive, from the cloud server 200, the gesture information that is not completely detected. The gesture information that is not completely detected by the terminal device 100 may be obtained by the cloud server 200 from another terminal device on which the same app is installed.

(3) The gesture management module 101 may determine, based on gesture information of the OS running or installed on the terminal device 100 and the gesture information of the app, whether a gesture conflict exists between the OS and the app.

(4) When determining that a gesture conflict exists between the OS and the app, the gesture management module 101 may prompt a user to set a standby gesture for a conflicted default gesture of the OS.

(5) The gesture management module 101 may prompt the user when the terminal device 100 enables and disables the standby gesture.

A specific function of the gesture management module 101 is described in detail below.

Still refer to FIG. 2 below. The memory 102 is configured to store the foregoing gesture information on the terminal device 100.

The cloud server 200 includes a gesture service module 201. The gesture service module may be implemented by hardware, or may be implemented by hardware executing corresponding software. Specifically, the gesture service module 201 is configured to collect, from each terminal device (including the terminal device 100), gesture information supported by each app, and update, to each terminal device, the gesture information supported by the app. For example, gesture information of each app is collected from each terminal device 100 or from a developer of each app (for example, when an app is registered or listed in an application store, the app developer is required to provide gesture information; for another example, each terminal device 100 is requested to report gesture information of an app obtained by the terminal device 100). In addition, latest collected gesture information of the app is sent to the terminal device 100 based on a request of the terminal device 100 or in a periodic push manner, to resolve a problem that each terminal device 100 cannot completely detect all gesture information of the app by using the terminal device 100.

In addition, in some embodiments, the gesture service module 201 is further configured to: determine whether a conflict exists between the OS of the terminal device 100 and the app running on the terminal device 100, and send a determining result to the terminal device 100. For example, an OS of a same or similar version may be installed on each terminal device 100. In this case, the cloud server 200 may determine whether a conflict exists between a gesture supported by an OS of a specific version and a gesture supported by one or more apps, and directly sends a determining result to the terminal device 100 on which the corresponding apps are installed.

In the gesture conflict resolution system, each terminal device 100 may conveniently obtain gesture information of one or more apps from the cloud server 200, to predict and process a gesture conflict before the app is used or before a gesture conflict occurs between the app and the OS. In addition, each terminal device 100 may also report, to the cloud server 200 in a timely manner, the gesture information of the app collected by the terminal device 100, so as to share the gesture information with another terminal device 100.

It may be understood that in embodiments of this application, the terminal device 100 may be any device that can perform interaction by using a gesture, for example, any device with a touchscreen, such as a mobile phone, a computer, a laptop computer, a tablet computer, a television, a game machine, a display device, an outdoor display, an in-vehicle terminal, and a music player, or a device that can identify gesture interaction, such as a somatic game machine. The user may implement different functions by using different gestures, to facilitate interaction between the user and the device. In some implementations, embodiments of this application may also be applied to a wearable device worn by the user. For example, the wearable device may be a smartwatch, band, jewelry (for example, a device made into an ornamental article such as an earring or a bracelet), glasses, or the like, or may be used as a part of a watch, a band, jewelry, glasses, or the like. An example of a structure of the terminal device 100 is described below with reference to FIG. 20. The following uses an example in which a mobile phone 100a is used as the terminal device 100 to describe in detail a method for resolving a gesture conflict between an OS and an app with reference to FIG. 3 to FIG. 19.

In addition, in embodiments of this application, the cloud server 200 may be a hardware server, or may be embedded in a virtualization environment. For example, according to some embodiments of this application, the cloud server 200 may be a virtual machine executed on a hardware server including one or more other virtual machines. According to some embodiments of this application, the cloud server 200 may interact with the terminal device 100 through a network, for example, send data to the terminal device 100 and/or receive data from the terminal device 100.

In addition, it may be understood that in another embodiment of this application, another type of server may alternatively be used to perform the foregoing function of the cloud server 200. This is not limited herein. Certainly, the gesture conflict resolution system 10 is merely a specific implementation of this application. In some implementations, the terminal device 100 may not interact with the cloud server 200, but detect and process a gesture conflict independently only by using the gesture management module 101 of the terminal device 100.

Figure 3:
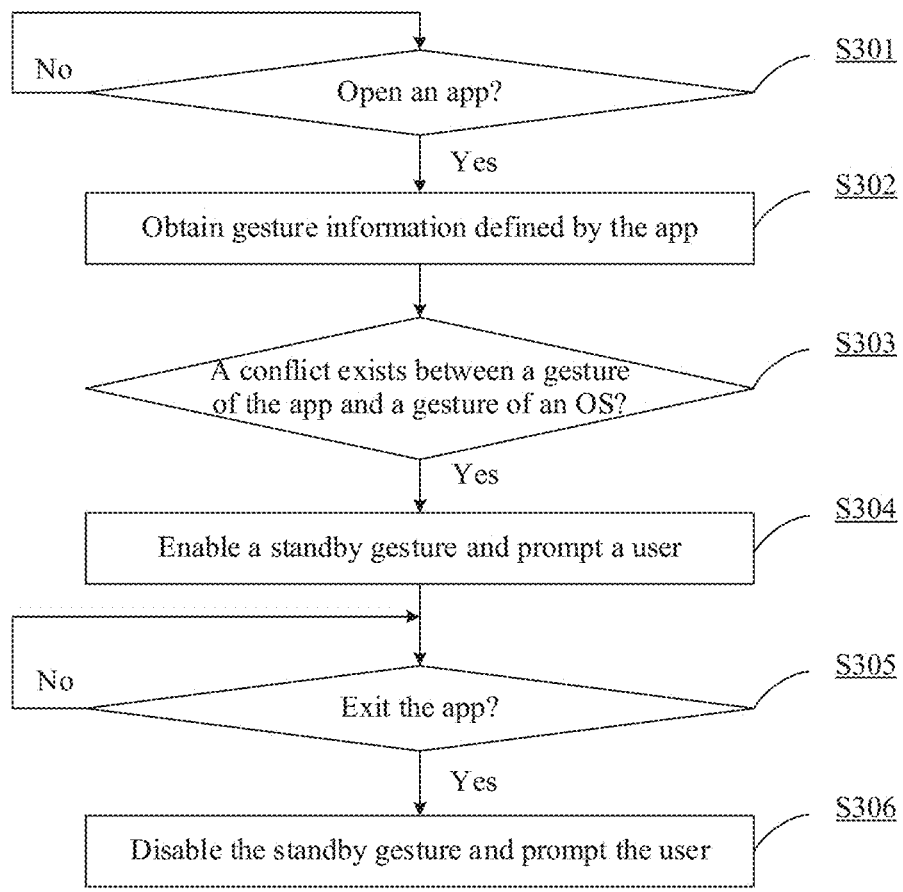
FIG. 3 shows an example of a gesture conflict resolution method when a gesture supported by an app is known or has been prestored according to an embodiment of this application.

FIG. 3 shows an example of a gesture conflict resolution method when a gesture supported by an app is known or has been prestored.

In an embodiment shown in FIG. 3, related information of the gesture supported by the app may be collected by the mobile phone 100a during registration, installation, or previously using of the app, or may be obtained by the mobile phone 100a from the cloud server 200 and stored, or may be stored in the cloud server 200 and queried by the mobile phone 100a from the cloud server 200. According to some embodiments of this application, a gesture operation method shown in FIG. 3 may be performed by using the gesture management module 101 and the like in FIG. 2.

As shown in FIG. 3, the gesture operation method may include the following steps.

Figure 4:
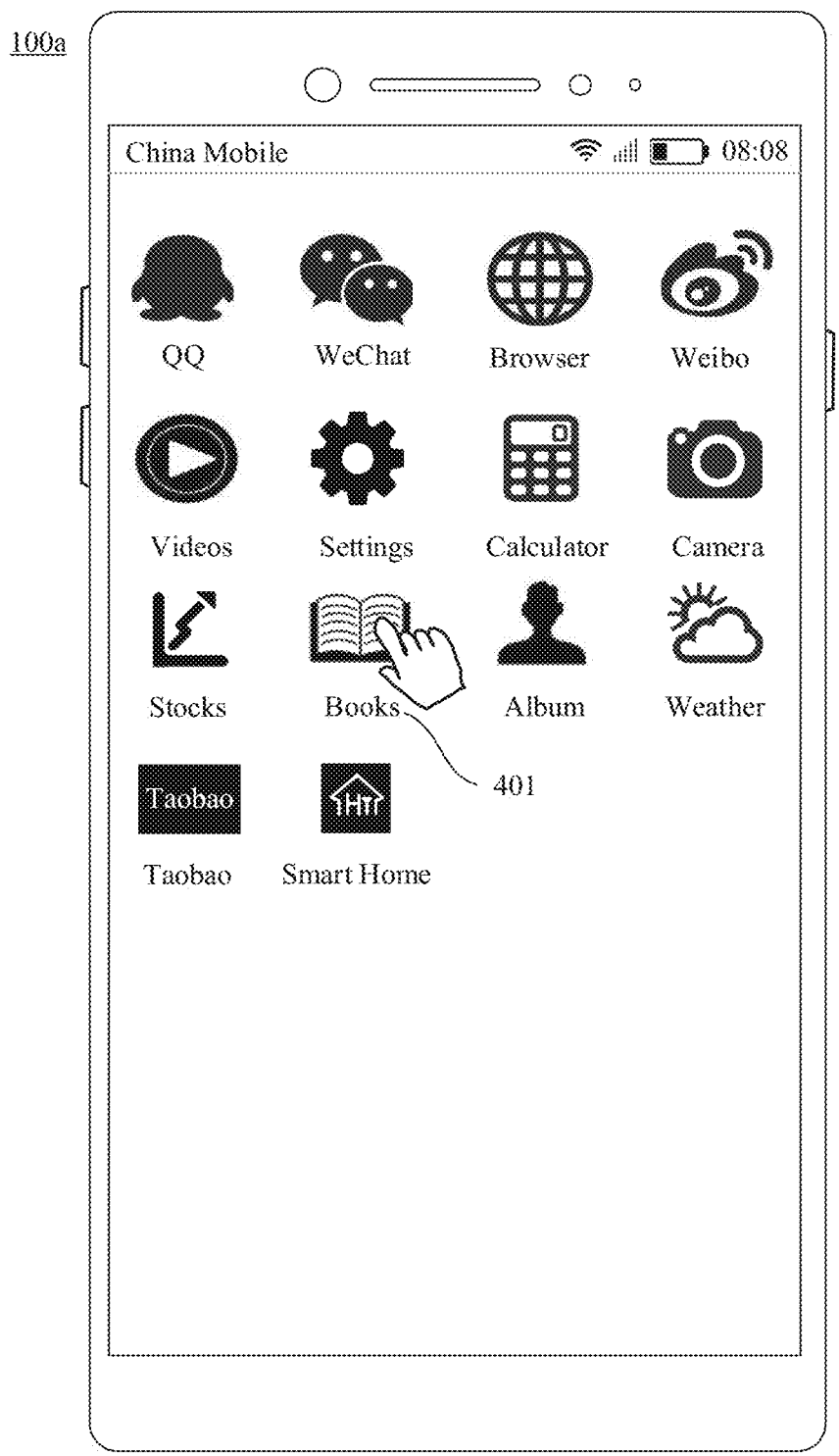
FIG. 4 shows an example of a UI on which a user taps an icon of Books to enter Books.

S301: The mobile phone 100a detects whether an app is opened, and when an app is detected to be opened, S302 continues to be performed. For example, as shown in FIG. 4, after a user turns on the mobile phone 100a, the user may tap an icon 401 of Books on a user interface (user interface, UI) in FIG. 4 to enter Books. When the mobile phone 100a detects the operation of tapping the icon 401 of Books by the user, S302 continues to be performed.

S302: The mobile phone 100a obtains gesture information supported by the opened app, where the information may be obtained from the local memory 102 of the mobile phone 100a, or may be directly queried from the cloud server 200.

Subsequently, S303: The mobile phone 100a determines, by comparing the obtained gesture information of the app with gesture information of an OS of the mobile phone 100a, whether a conflict exists between a gesture of the opened app and a default gesture of the OS. If there is a conflict, S304 is performed.

For example, it is assumed that gestures supported by Books and gestures supported by the OS are shown in Table 1.

TABLE 1

| | Supported gesture | Function |
|---|---|---|
| OS | Slide left from the right edge | Back |
| | Slide up from the bottom | Return to the home screen |
| Books | Slide right from the left edge | Previous page |
| | Slide left from the right edge | Next page |

It can be learned from the example in Table 1 that the function defined in the OS for "slide left from the right edge" is "back", and the function defined in Books for "slide left from the right edge" is "next page". To be specific, a conflict occurs between the gestures of "slide left from the right edge" supported by the OS and Books.

In this application, for clarity, a gesture originally supported by the OS may be referred to as a default gesture, to be distinguished from a standby gesture.

In addition, it may be understood that, in another embodiment of this application, the cloud server 200 connected to the mobile phone 100a may alternatively be configured to determine whether a conflict exists between the gesture of the app and the default gesture of the OS, and the mobile phone 100a obtains a determining result of the cloud server 200. For example, as described above, the cloud server 200 obtains the gesture information of the gesture supported by the app of the mobile phone 100a and the default gesture supported by the OS, and determines whether a same gesture exists in the gesture supported by the app and the default gesture supported by the OS. When a same gesture exists, it is determined that a gesture conflict exists.

S304: The mobile phone 100a enables the standby gesture and notifies the user.

It may be understood that, in some embodiments of this application, a standby gesture may be preset for at least one of default gestures of the OS, to directly enable a standby gesture of a conflicted default gesture in the system when a gesture conflict is detected, to fully avoid gestures supported by various apps. For example, when default gestures are set for the OS, a standby gesture of each default gesture may be set at the same time, or after the OS is installed, a standby gesture may be selected for each default gesture from candidate gestures stored in the OS. The selection herein may be random. Alternatively, the selection may be performed according to a preset sequence, and the selection sequence may be set according to a specific situation. This is not limited herein. In addition, when the mobile phone 100a is initially used, the user may be prompted to set a standby gesture for the default gesture of the OS or select a standby gesture from the candidate gestures stored in the OS.

It may be understood that standby gestures may be preset for all default gestures supported by the OS, or standby gestures may not be set for all the default gestures supported by the OS, but standby gestures are set for some selected default gestures. For example, standby gestures are set for some gestures in which conflicts are likely to occur and that are selected from all the default gestures supported by the OS, or the user can optionally customize a standby gesture. For example, in some embodiments, at least one standby gesture is preset for each default gesture supported by the OS of the mobile phone 100a. The standby gesture of the default gesture may be any gesture different from the default gesture, or may be a gesture that is obtained after statistical analysis is performed on gesture information of each app and that does not conflict with a gesture of each app or that has a relatively low conflict probability.

In the foregoing example, for a gesture conflict of "slide left from the right edge", as shown in Table 2, when setting "slide left from the right edge" to a default gesture of a "back" operation, the OS may set "slide up from the right edge" as the default gesture of the "back" operation. In this case, when Books is used, the gesture "slide up from the right edge", instead of the gesture "slide left from the right edge", is used as the "back" gesture, and no gesture conflict exists between the OS and Books.

TABLE 2

|  | Supported gesture | Standby gesture | Function |
| --- | --- | --- | --- |
| OS | Slide left from the right edge | Slide up from the right edge | Back |
|  | Slide up from the bottom | Turn a circle counterclockwise at the bottom | Return to the home screen |
| Books | Slide right from the left edge |  | Previous page |
|  | Slide left from the right edge |  | Next page |

Therefore, in S304, for the examples described in Table 1 and Table 2, when the mobile phone 100a determines that a conflict exists between the gesture "slide left from the right edge" in Books and the gesture "slide left from the right edge" supported by the OS, after Books is opened, the mobile phone 100a directly enables the standby gesture "slide up from the right edge" of the gesture "slide left from the right edge" to perform the "back" function, and notifies the user of the change.

Figure 5:
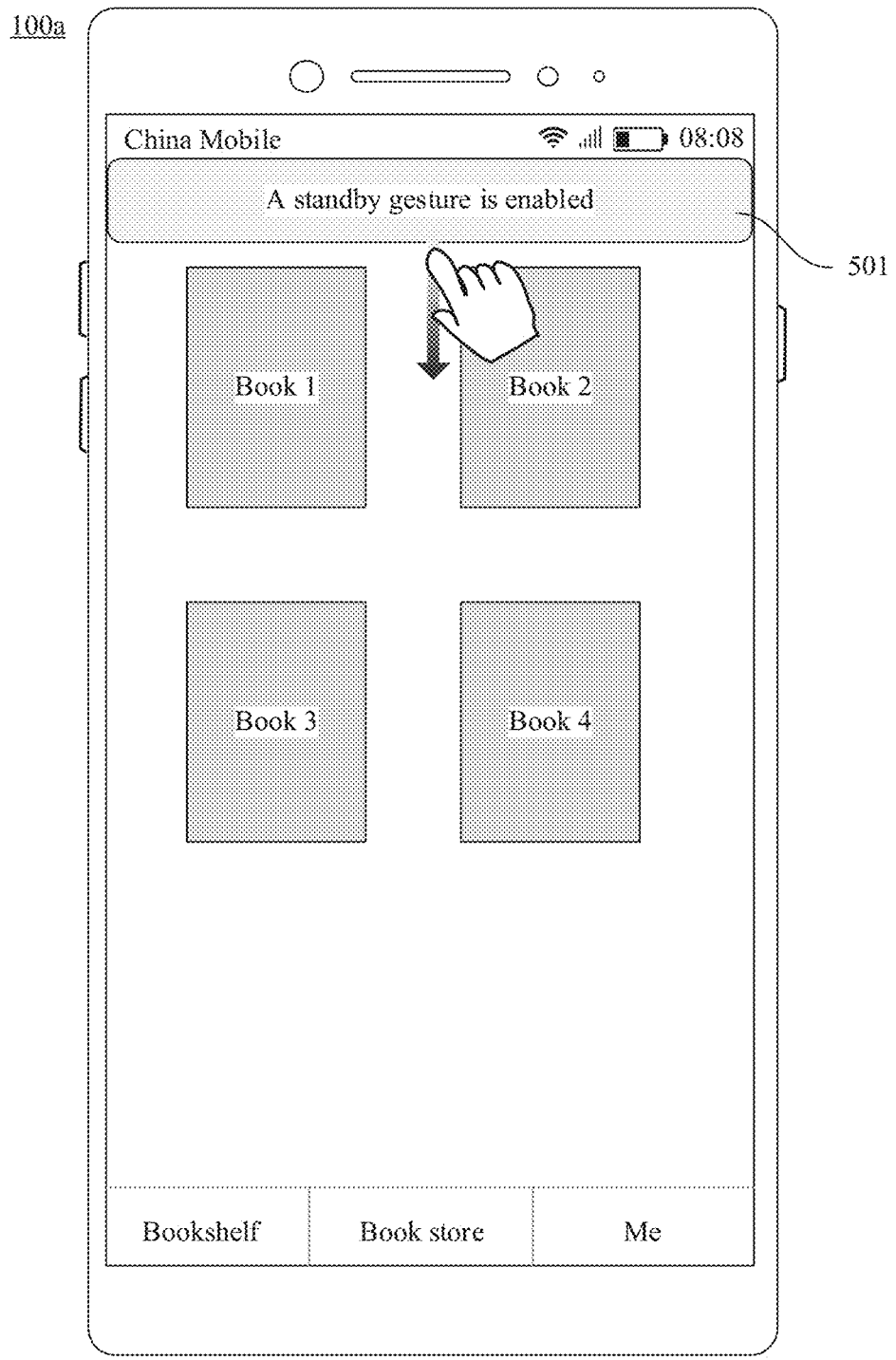
FIG. 5 shows an example of a UI on which a user is notified, in a form of a notification bar on a main interface of Books, that a standby gesture is enabled.
Figure 6:
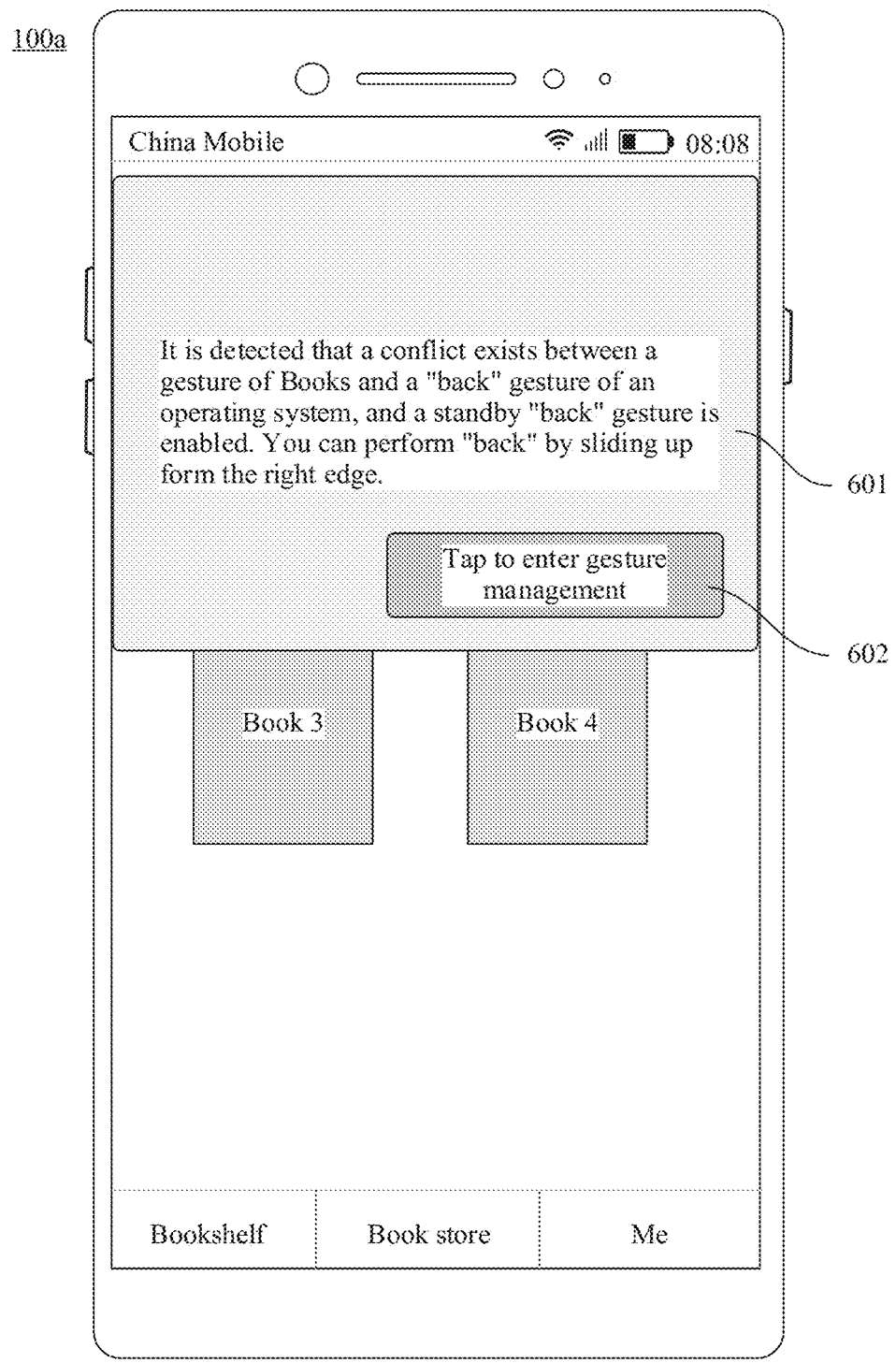
FIG. 6 shows an example of a UI on which the user pulls down the notification bar in FIG. 5 to obtain detailed notification information.

For an example of a UI on which the user is notified, refer to FIG. 5 to FIG. 6. After the user taps the icon 401 of Books in FIG. 4 to enter Books, the mobile phone 100a may display notification information in a notification bar 501 above the UI interface of Books, to notify the user that the standby gesture is enabled. In some other implementations, the mobile phone 100a may alternatively notify, in another manner, the user that the standby gesture is enabled, for example, by popping up a window, or displaying a text, an animation, or an image on a blurred background.

The user may learn detailed information 601 (refer to FIG. 6) by pulling down the notification bar 501 in FIG. 5. In some embodiments, a gesture management portal may be provided when the detailed information 601 is provided. As shown in FIG. 6, the user may tap a button 602 "Tap to enter gesture management" in FIG. 6 to enter a gesture management page (not shown), to set and manage a gesture, for example, reset the standby gesture or disable the standby gesture.

Figure 7:
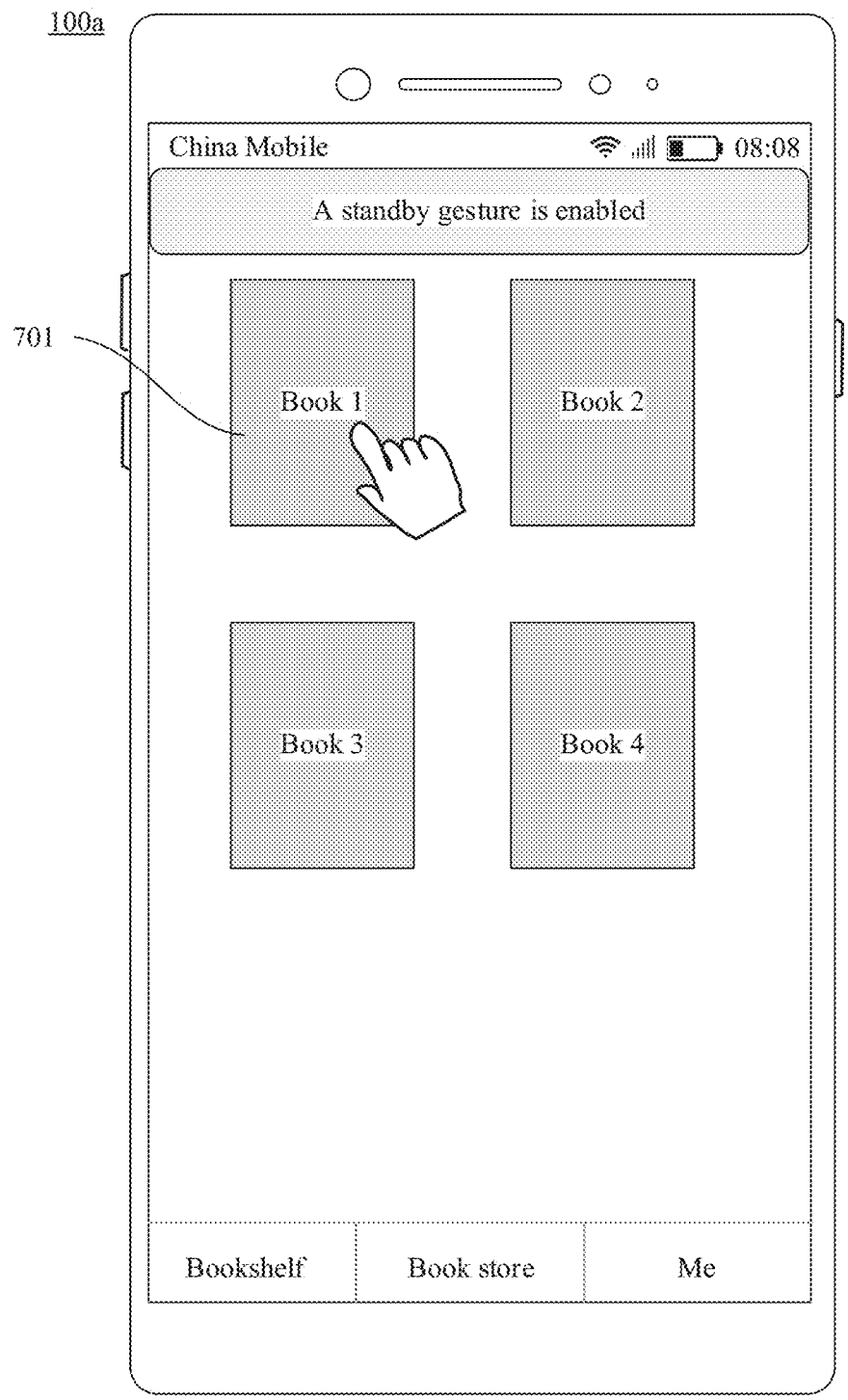
FIG. 7 shows an example of a UI on which a book icon is tapped on a main interface of Books to open a book.
Figure 8A:
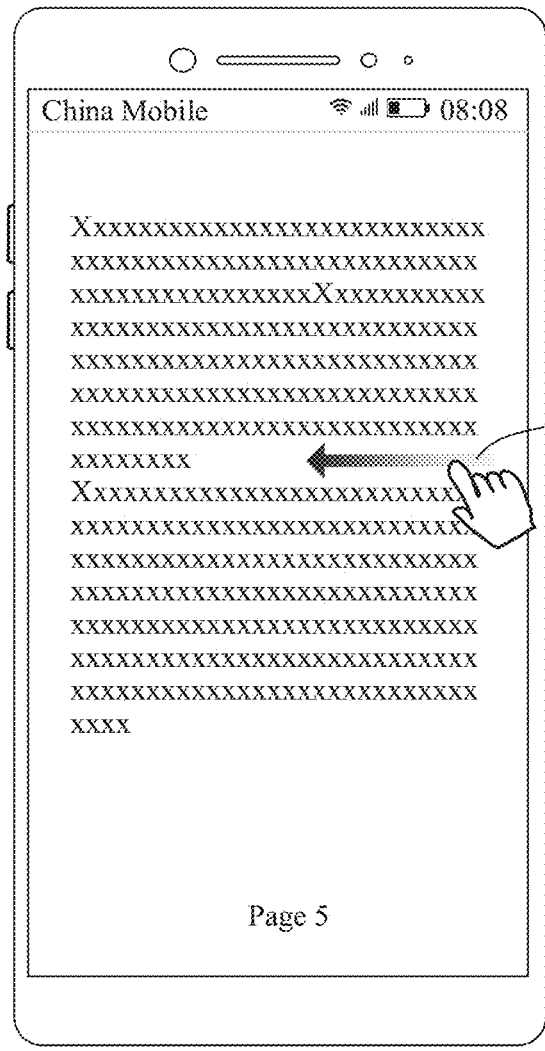
FIG. 8A shows an example of a UI on which a user uses a conflicted gesture "slide left from the right edge"
Figure 8B:
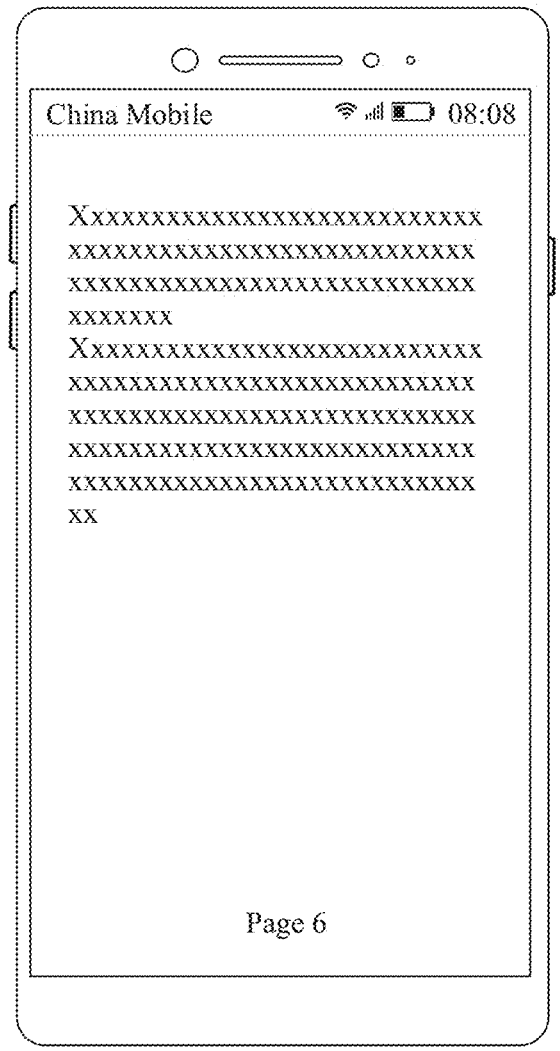
FIG. 8B shows a response effect of a mobile phone to the gesture shown in FIG. 8A.

After the standby gesture is enabled, when the user executes the conflicted gesture, the corresponding function of the app is implemented in response to the conflicted gesture, but the corresponding function of the OS cannot perform responding. However, the corresponding function of the OS may be implemented by using the standby gesture. For example, as shown in FIG. 7, the user taps an icon 701 of a "book 1" in Books to open the book 1 (refer to FIG. 8A). On an interface shown in FIG. 8A, if the user uses a conflicted gesture 801 "slide left from the right edge", a function response of Books takes effect, and the book is turned to a next page (that is, turn from a page 5 shown in FIG. 8A to a page 6 shown in FIG. 8B), but the "back" function defined by the original OS does not perform responding.

However, the user may perform "back" by using the standby gesture. For example, if the user performs a gesture 901 "slide up from the right edge" shown in FIG. 9A on the page 5 of the opened "book 1", the OS performs the "back" function in response to the gesture (that is, back from content on the page 5 shown in FIG. 9A to a bookshelf interface of Books shown in FIG. 9B).

In this case, by using "slide up from the right edge" as the standby OS gesture of "slide left from the right edge", both the "back" function defined by the OS and the "next page" function defined by Books can be separately responded to, and the user may implement the "page turning" function by using the gesture "slide left from the right edge", and implement the "back" function by using the gesture "slide up from the right edge of the screen".

S305: The mobile phone detects exit of the current app, and after the current app is exited (for example, the home screen is returned to, or another app is switched to), S306 continues to be performed: Disable the system standby gesture, and prompt the user.

Figure 9A:
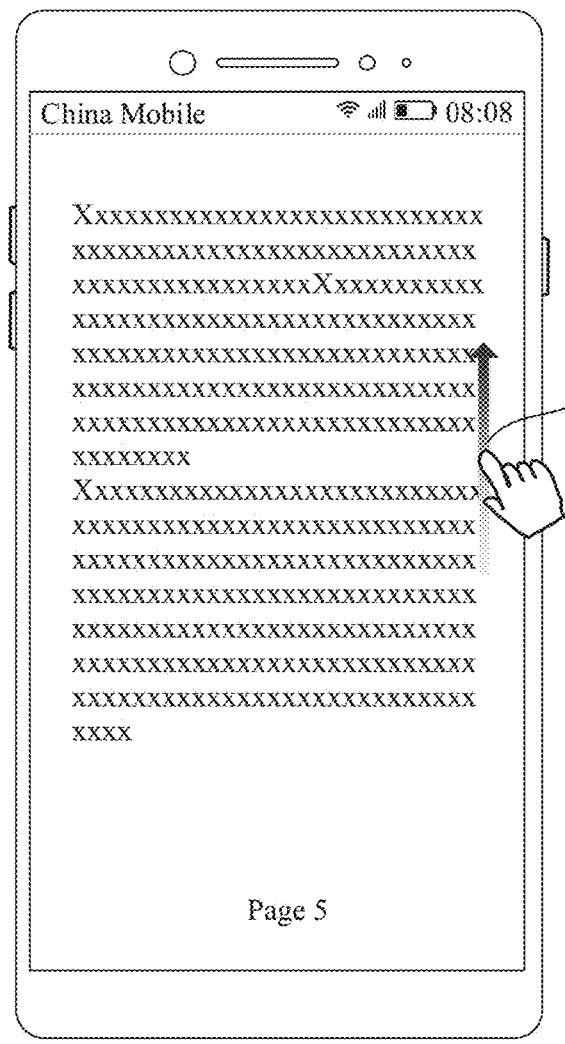
FIG. 9A shows an example of a UI on which a user uses a standby gesture "slide up from the right edge"
Figure 9B:
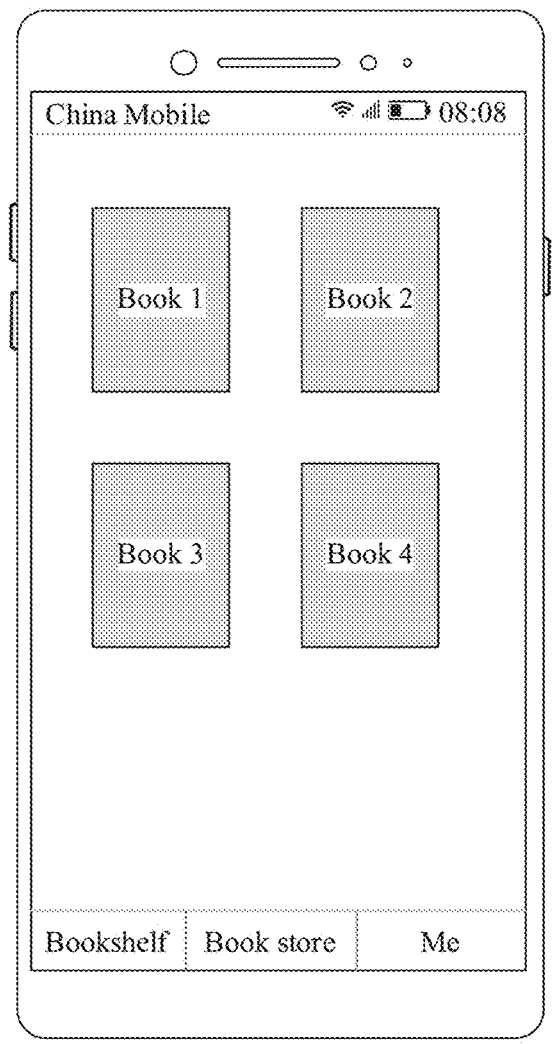
FIG. 9B shows a response effect of a mobile phone to the gesture shower in FIG. 9A.
Figure 10A:
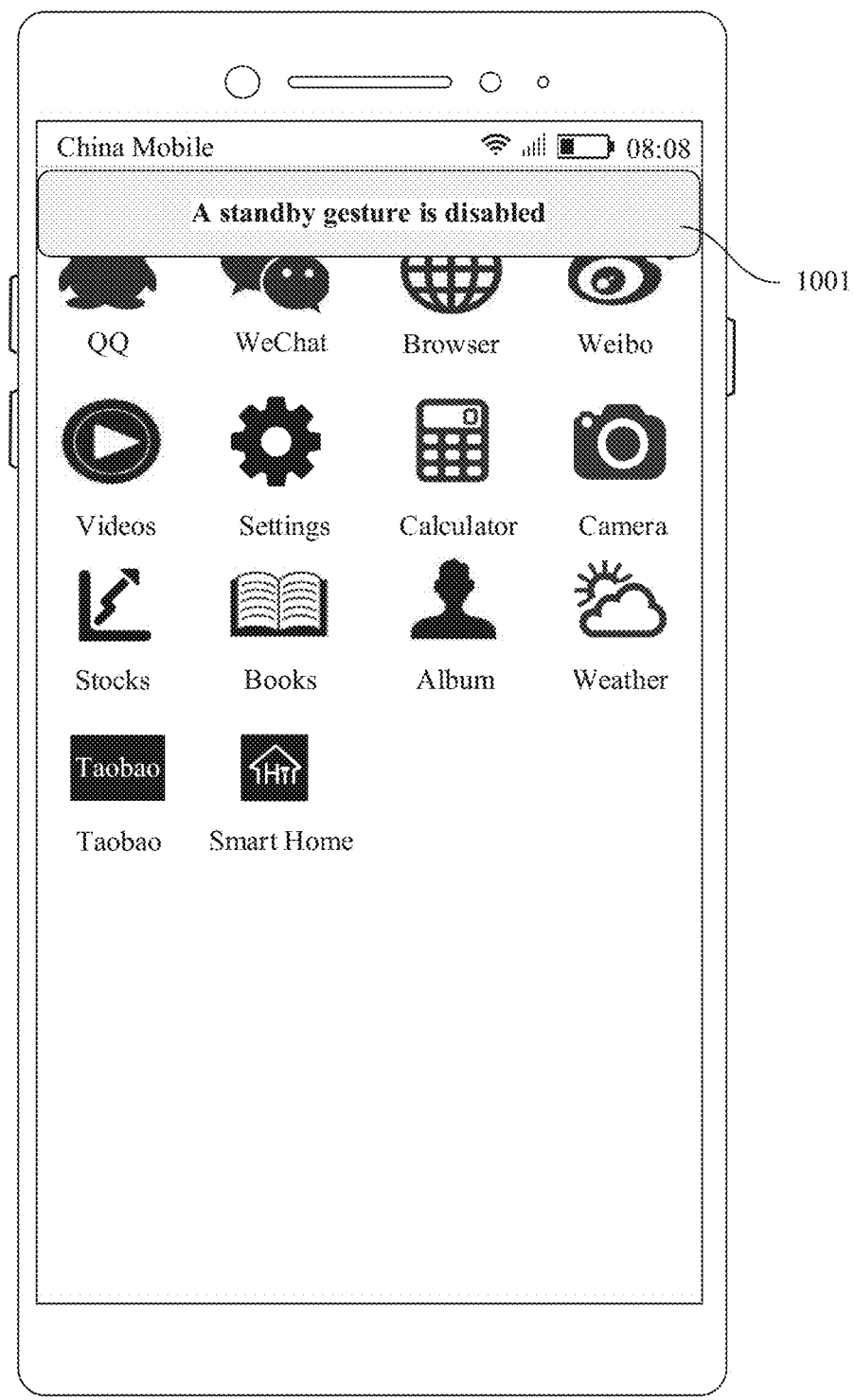
FIG. 10A shows an example of a UI on which a user is notified, in a form of a notification bar, that a standby gesture is disabled after Books is exited.
Figure 10B:
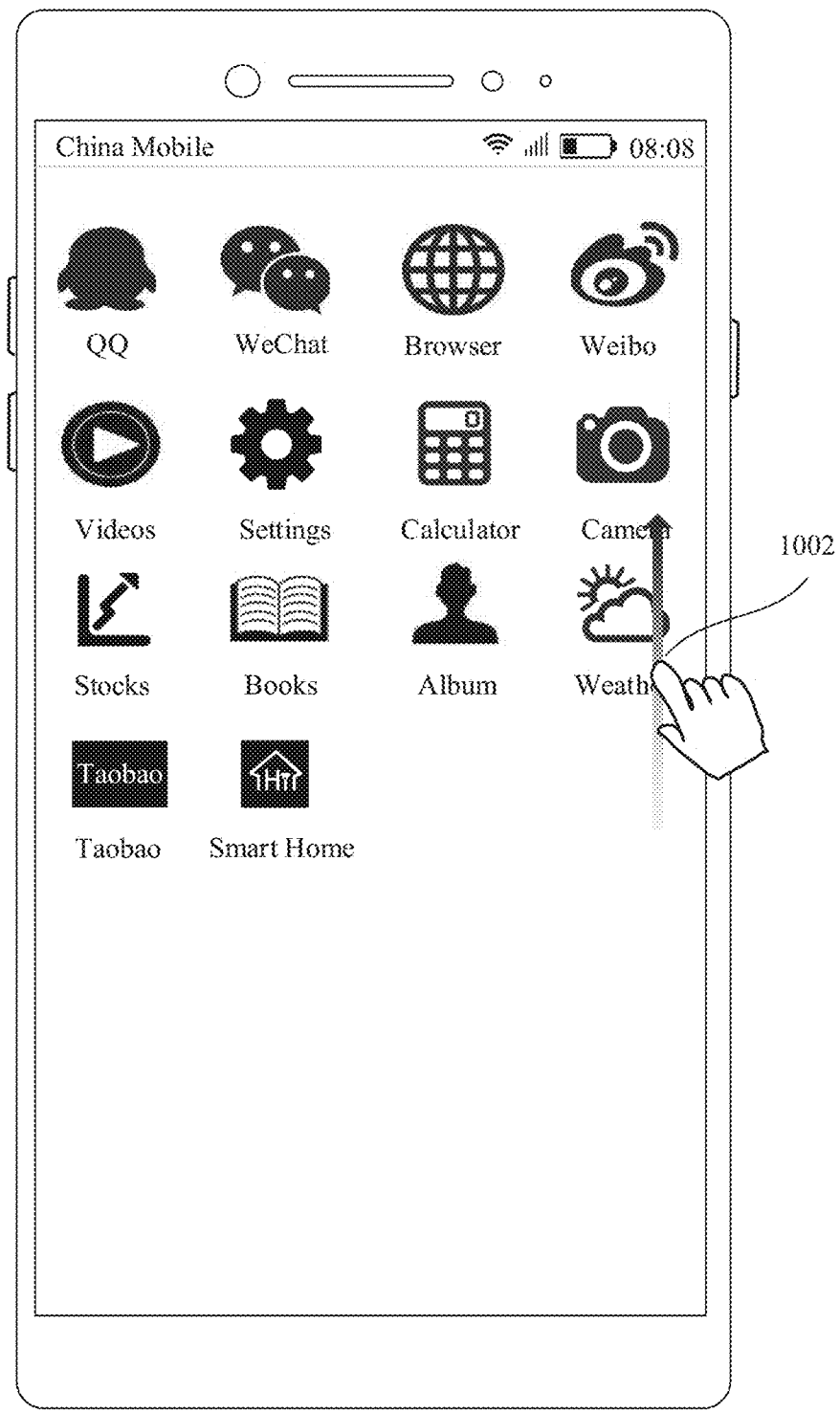
FIG. 10B shows an example of a UI on which a user uses a standby gesture "slide up from the right edge" after the standby gesture is disabled.

For example, after the mobile phone 100a returns from the bookshelf interface shown in FIG. 9B to the home screen shown in FIG. 10A, notification information may be displayed in a notification bar 1001 above the home screen, to notify the user that the standby gesture is disabled. In this case, if the user executes a standby gesture 1002 "slide up from the right edge" in the manner shown in FIG. 10B, the system does not perform responding. In some other implementations, the mobile phone 100a may alternatively notify, in another manner, the user that the standby gesture is disabled, for example, by popping up a window, or displaying a text, an animation, or an image on a blurred background.

In addition, it may be understood that, in the embodiment shown in FIG. 3, after detecting that the app is opened, the mobile phone 100a needs to determine whether the gesture of the opened app conflicts with the default gesture of the OS, and enable the standby gesture when determining that the conflict exists. However, in another embodiment of this application, the mobile phone 100a or the cloud server 200 learns, through one-time detection, whether the gesture of the app conflicts with the default gesture of the OS, and may set the standby gesture for the conflicted default gesture after detecting that the conflict exists. Therefore, after subsequently detecting that the app is opened, the mobile phone 100a may directly set the standby gesture for the conflicted default gesture, or directly open the conflicted default gesture to set the standby gesture, without performing conflict determining each time it is detected that the app is opened.

The foregoing describes, with reference to FIG. 3 to FIG. 10B, examples of the gesture conflict resolution method when a gesture supported by an app is known or has been prestored. The standby gesture of the OS is set, so that in a scenario in which the gesture of the OS conflicts with the gesture of the app, the user can still use the gesture functions of the OS and the app to perform responding. In some embodiments of this application, the operation S301 in FIG. 3 needs to be performed only once, and the standby gesture may be always used subsequently after being set.

Figure 11:
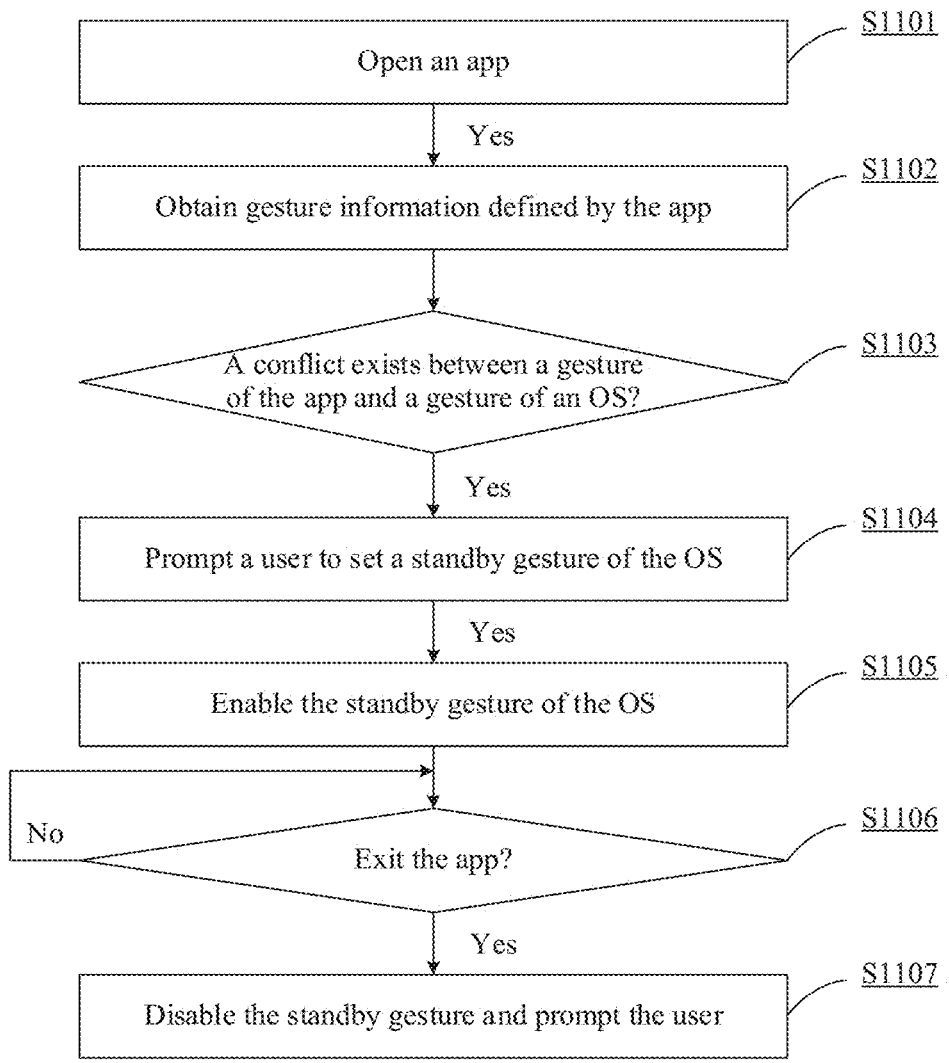
FIG. 11 shows an example of a method for not presetting a standby gesture but setting a standby gesture of an OS after it is determined that a gesture conflict exists between an app and the OS according to an embodiment of this application.

According to some other embodiments of this application, the standby gesture may not be preset, but the operation of setting the standby gesture of the OS is performed after it is determined that a gesture conflict exists between the app and the OS. In this case, the user may be prompted to only set a standby gesture for a conflicted gesture, and there is no need to set standby gestures for all default gestures of the OS. A specific process is shown in FIG. 11.

First, S1101: An app in the mobile phone 100a is opened. For example, on the home screen of the mobile phone 100a (refer to FIG. 4), the user taps the icon 401 of Books on the UI shown in FIG. 4 to enter Books.

Subsequently, operations of S1102 and S1103 are similar to the operations of S303 and S304 in FIG. 3. Details are not described herein again. In S1103, if the mobile phone 100a determines that a conflict exists between a gesture of Books and a default gesture of the OS, S1104 continues to be performed: The mobile phone 100a prompts the user to set a standby gesture.

Figure 12:
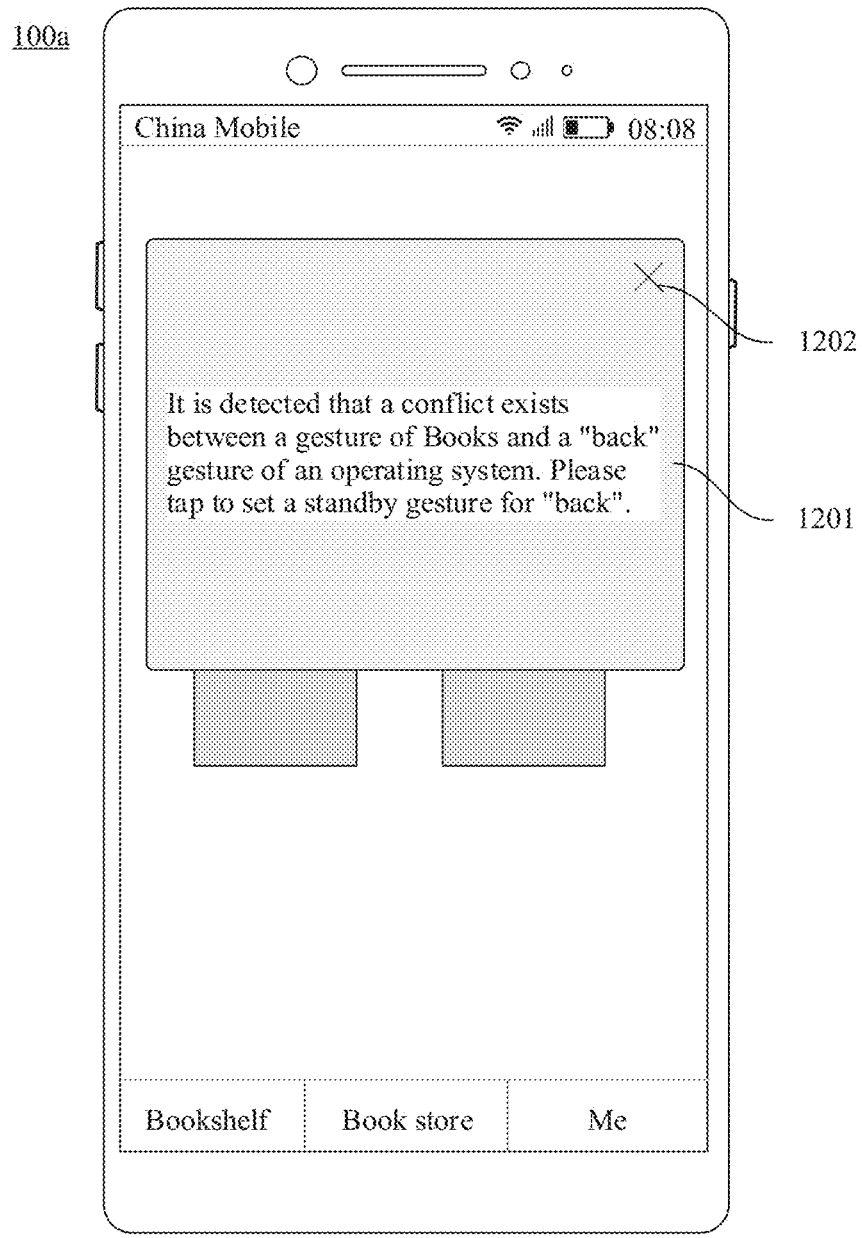
FIG. 12 shows an example of a UI on which a user is prompted to set a standby gesture after a mobile phone determines that a conflict exists between a gesture of Books and a default gesture of an OS.
Figure 13:
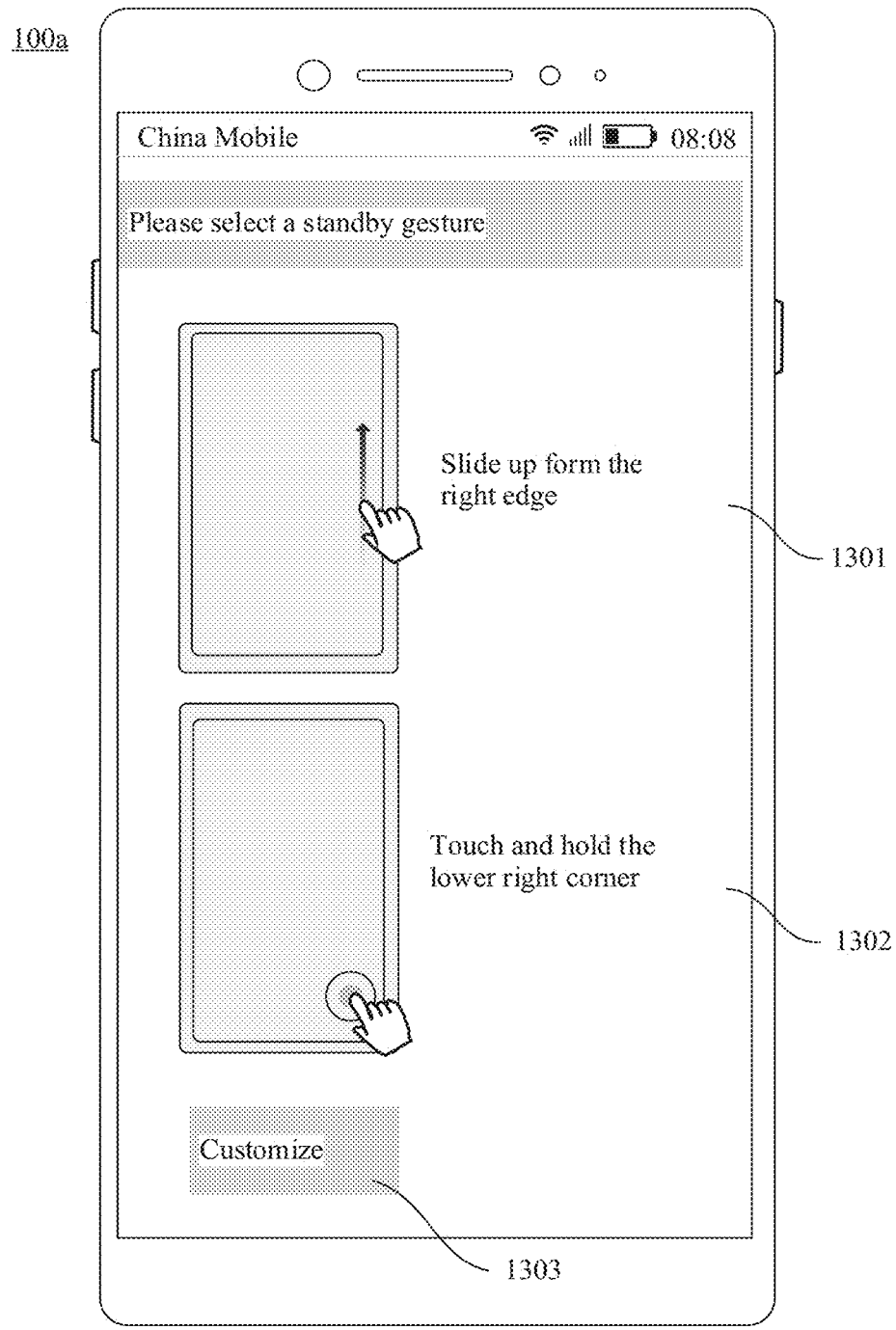
FIG. 13 shows an example of a standby gesture setting interface.

For example, as shown in FIG. 12, after Books is entered, if the mobile phone 100a determines that a conflict exists between the gesture of Books and the default gesture of the OS, prompt information 1201 may be popped up on the UI Interface of Books, to prompt the user that a gesture conflict exists between Books and the OS, and request the user to set a standby gesture. The user may tap the pop-up prompt information 1201 in FIG. 12 to enter a standby gesture setting interface. An example of the standby gesture setting interface is shown in FIG. 13. After entering the standby gesture setting page, the user may select a standby gesture provided by the system, for example, select 1301 "slide up from the right edge" or 1302 "touch and hold the lower right corner" shown in FIG. 13, or perform customization 1303 on the "back" gesture.

In some implementations, the user may be prompted in a manner other than by popping up the window shown in FIG. 12, for example, by using a notification bar, or by displaying a text, an animation, or an image on a blurred background.

After the user sets the standby gesture, S1105 is performed: The system enables the standby gesture set by the user.

In this case, according to some embodiments of this application, the standby gesture set by the user may be stored in the mobile phone 100a, so that the standby gesture can be directly used without being set again when a same gesture conflict occurs in a subsequent use process of the app or another app. However, according to some other embodiments of this application, the standby gesture may alternatively not be stored, but the user is prompted to set a standby gesture each time a conflict occurs.

Refer to FIG. 12 again. When the user considers that a standby gesture does not need to be set, the user may directly tap a pop-up close button 1202, to skip standby gesture setting and directly use Books. In this case, the gesture conflict still exists. After detecting a conflicted gesture of the user, the mobile phone 100a may perform an operation corresponding to the gesture in Books. For example, for the foregoing gesture "slide left from the right edge", after the gesture "slide left from the right edge" of the user is detected, the "page turning" function of Books instead of the "back" function of the OS is executed.

Operations of S1106 and S1107 are similar to the operations of S306 and S307. The mobile phone detects exit of the current app, disables the system standby gesture after the current app is exited (for example, the home screen is returned to, or another app is switched to), and prompts the user.

In addition, it may be understood that, in another embodiment of this application, in S1104, the mobile phone 100a may alternatively select, from the candidate gestures stored in the mobile phone 100a, a standby gesture for a conflicted default gesture. The selection herein may be random. Alternatively, the selection may be performed according to a preset sequence, and the selection sequence may be set according to a specific situation. This is not limited herein.

In addition, it may be understood that, in the embodiment shown in FIG. 11, after detecting that the app is opened, the mobile phone 100a needs to determine whether the gesture of the opened app conflicts with the default gesture of the OS. However, in another embodiment of this application, the mobile phone 100a or the cloud server 200 learns, through one-time detection, whether the gesture of the app conflicts with the default gesture of the OS. Therefore, after subsequently detecting that the app is opened, the mobile phone 100a may directly prompt the user to set the standby gesture for the conflicted default gesture, without performing conflict determining each time it is detected that the app is opened.

The foregoing describes, with reference to FIG. 3 to FIG. 13, examples of the gesture conflict resolution method when a gesture supported by an app is known or has been prestored. A standby gesture is preset or the standby gesture is set when the app is opened, so that both the gesture function defined by the system and the gesture function defined by the app can be responded to.

However, in some cases, a gesture supported by the app may not be pre-stored or known. In this case, an operation of the user may be directly monitored or detected in a use process of the app. If functions corresponding to some system gestures cannot be triggered in the use process of the app, it indicates that a gesture conflict exists.

Figure 14:
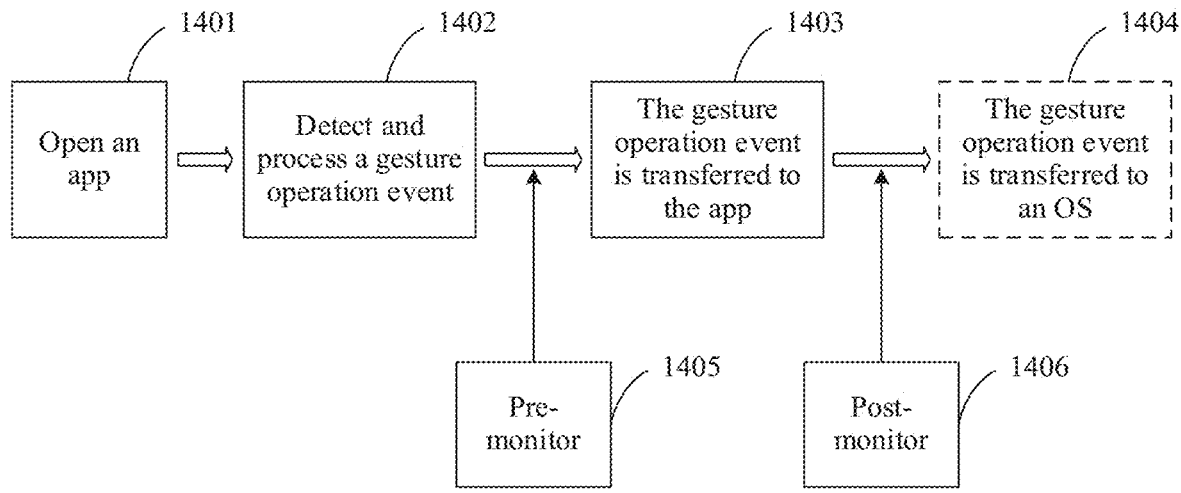
FIG. 14 shows an example of a method for monitoring an operation of a user in a use process of an app to obtain a conflicted gesture of the app and an OS according to an embodiment of this application.
Figure 15:
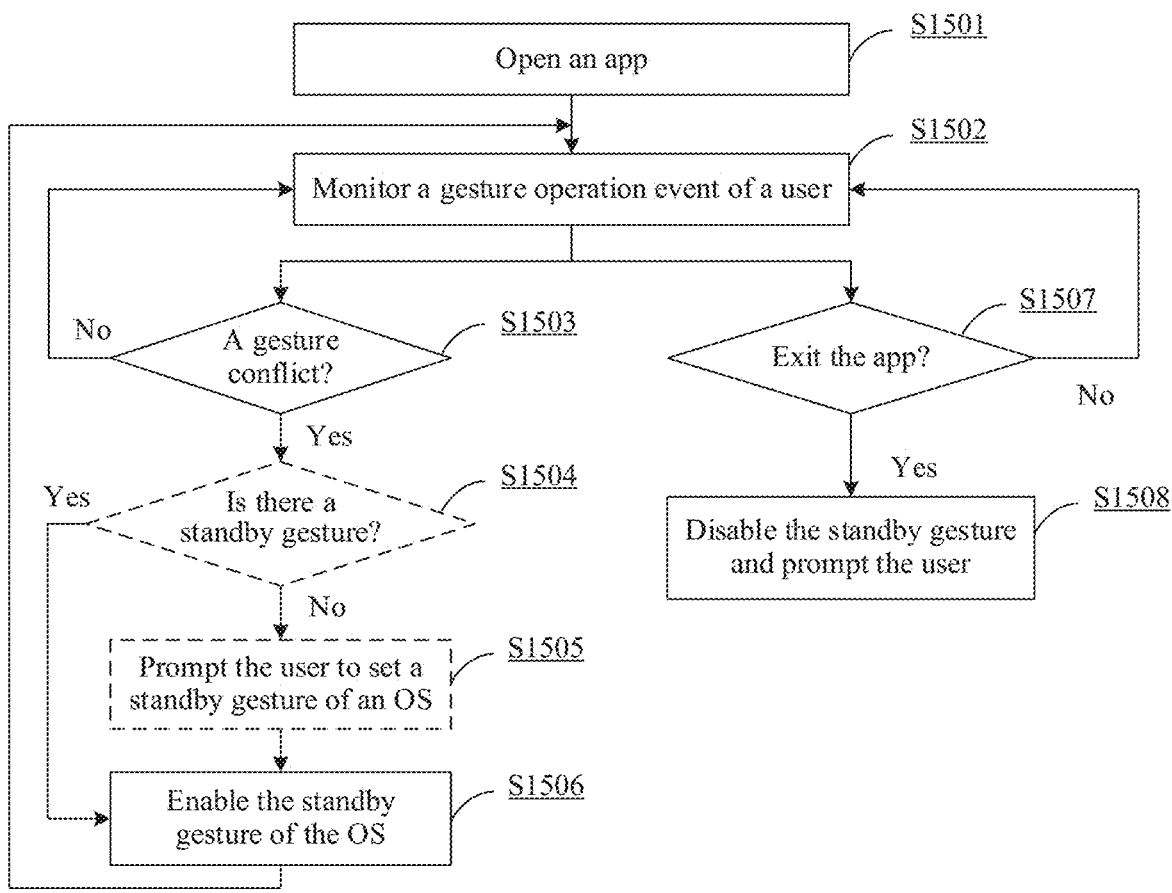
FIG. 15 shows an example of a gesture conflict resolution method when a gesture supported by an app is not prestored or known according to an embodiment of this application.

With reference to FIG. 14 and FIG. 15, the following describes a method for monitoring or detecting the operation of the user in the use process of the app to obtain a conflicted gesture between the app and the OS and resolving a gesture conflict.

According to some embodiments of this application, the conflicted gesture between the app and the OS may be obtained by monitoring a response procedure of a gesture operation event. In various devices such as a mobile phone that can perform interaction by using a gesture, after the user performs a gesture operation on the device, a gesture operation event is generated. The gesture operation event is transferred layer by layer and responded to at a proper stage. FIG. 14 shows a response procedure of a gesture operation event after an app in a device such as a mobile phone is turned on.

First, 1401: The app is opened. For example, as shown in FIG. 4, the user taps the icon 401 of Books on the UI shown in FIG. 4 to enter Books.

Subsequently, 1402: Detect and process a gesture operation event. After the user performs a gesture operation, a hardware layer of the device detects the gesture operation, and reports the gesture operation as an event. A main control system of the device invokes a related program to process the gesture operation event. For example, in the mobile phone, when the app is opened, a touch sensor of the mobile phone detects a gesture operation of the user, and the OS invokes a related program to perform preliminary processing on the gesture operation event: generating, based on a specific gesture motion of the user, a specific gesture operation event and a parameter corresponding to the gesture operation event.

Subsequently, 1403: The gesture operation event is sent to the app. If the gesture is a gesture supported by the app, the app responds to the event, and triggers a corresponding function, to end the gesture operation event.

If the gesture is not a gesture supported by the app, the app does not respond to the event. In this case, 1404: The gesture operation event is further transferred to the OS. If the gesture is a default gesture of the OS, the OS responds to the gesture and triggers a corresponding function. If the gesture is not a default gesture of the OS either, the event ends.

Therefore, if a gesture is both a gesture supported by the app and a default gesture of the OS, the gesture is intercepted and responded to by the app, but the OS cannot respond to the gesture.

Therefore, to determine whether a gesture is a conflicted gesture, two monitoring points may be inserted into an original gesture operation event processing procedure, and insertion points are located before and after the event is transferred to the app. According to some embodiments of this application, the two monitoring points may be respectively referred to as a pre-monitor and a post-monitor, as shown in FIG. 14. Under the effect of the pre-monitor 1405 and the post-monitor 1406, if a gesture is a default gesture of the OS, and the pre-monitor 1405 monitors the gesture operation event but the post-monitor 1406 does not monitor the gesture operation event, it may indicate that the gesture is responded to by the app and ends, and the gesture does not continue to be transferred to the OS, that is, it indicates that the gesture is also a gesture supported by the app. In this case, a conflict occurs between the OS and the app.

According to some embodiments of this application, functions of the pre-monitor 1405 and the post-monitor 1406 in FIG. 14 may be implemented by hardware, or may be implemented by hardware executing corresponding software. The hardware or the software may include one or more modules corresponding to the foregoing functions, these modules may be a part of the gesture management module 101 in FIG. 2, that is, the method for detecting a gesture conflict shown in FIG. 14 may be performed by using the gesture management module 101 in FIG. 2.

When a gesture supported by the app may not be pre-stored or known, gesture detection may be dynamically performed in a running period of the app by using the solution shown in FIG. 14. If a conflict is detected, a standby gesture is enabled and the user is prompted. After the app exited, the standby gesture is disabled. A specific process is shown in FIG. 15.

First, S1501: The app is opened. For example, on the home screen of the mobile phone 100*a* (refer to FIG. 4), the user taps the icon 401 of Books on the UI shown in FIG. 4 to enter Books.

Figure 16:
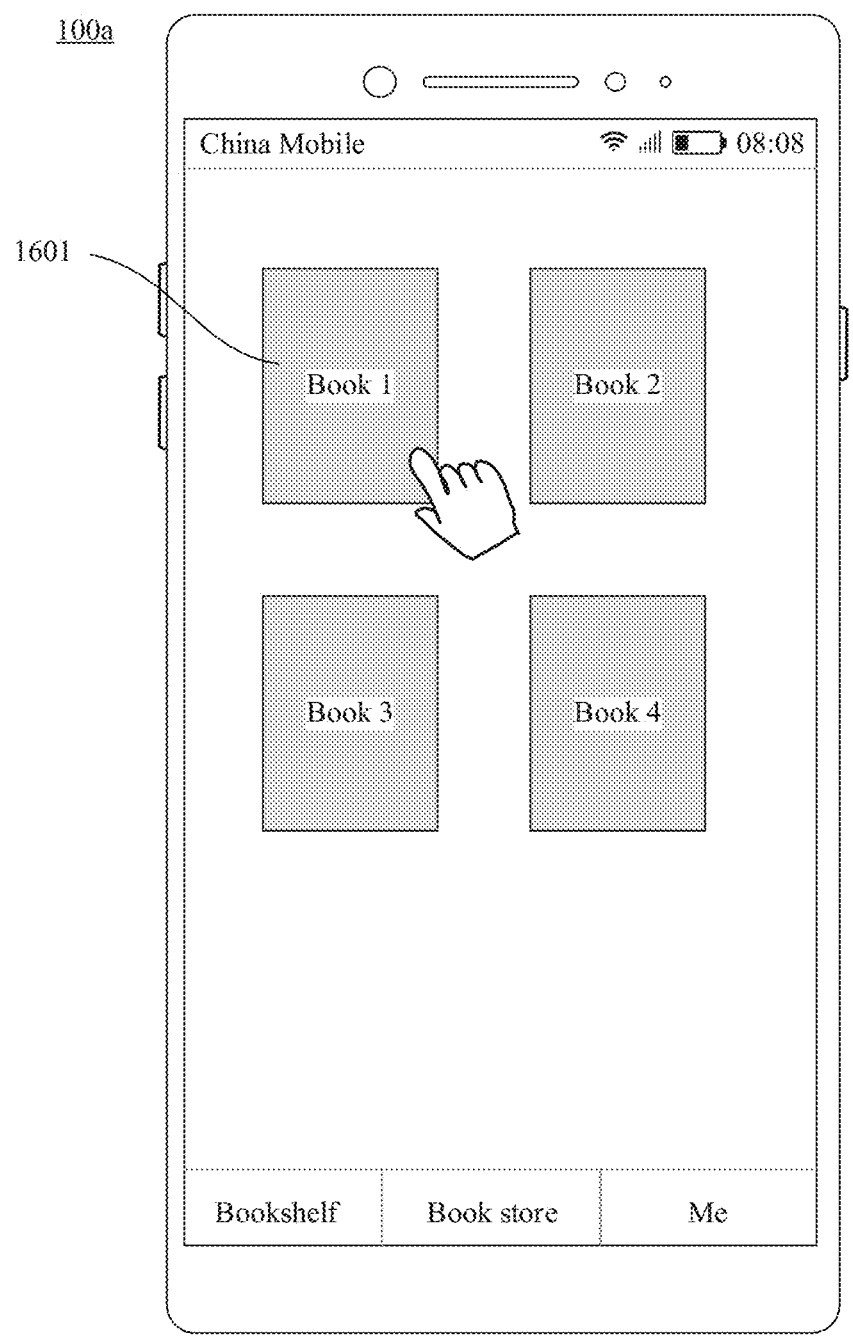
FIG. 16 shows an example of a main interface obtained after a user enters Books when a gesture supported by Books is not pre-stored or known.
Figure 17:
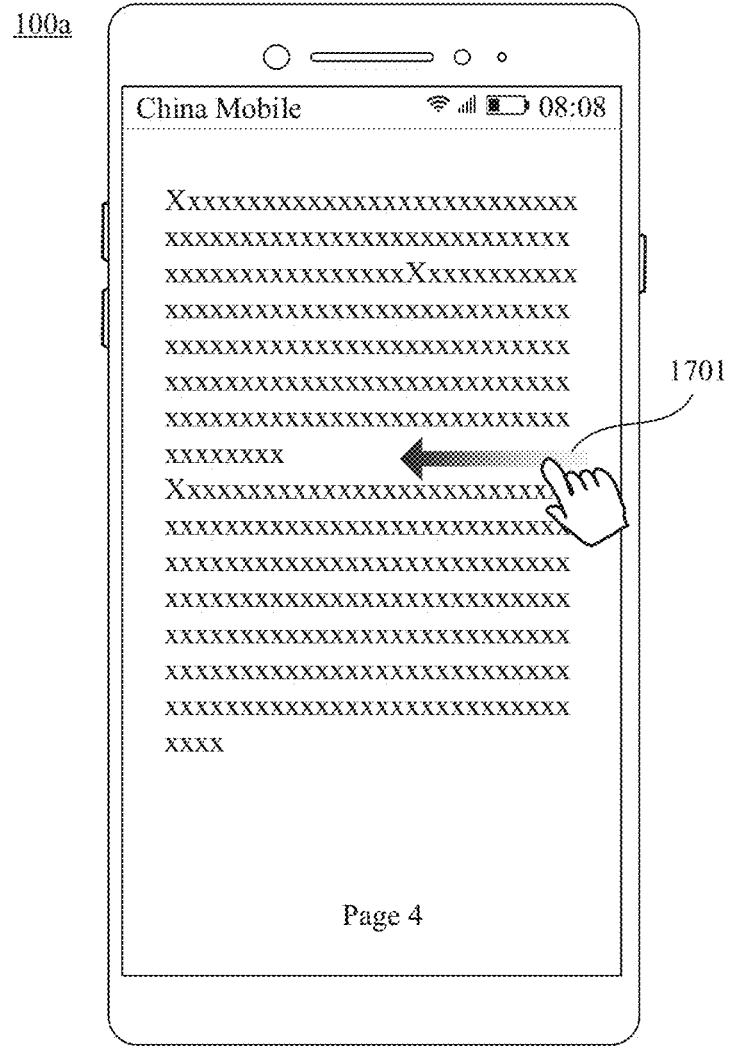
FIG. 17 shows an example of a UI on which a user performs a gesture operation in Books.

Subsequently, S1502: The mobile phone 100*a* monitors the gesture operation event of the user by using the operation shown in FIG. 14, For example, as shown in FIG. 16, after entering Books, the user may tap the "book 1" to open the book 1 for reading, and perform various gesture operations. As shown in FIG. 17, in this process, the mobile phone 100*a* continuously monitors the gesture operations of the user.

S1503: Determine, based on a monitoring result in S1502, whether a gesture of the opened app conflicts with a default gesture of the OS. When there is no conflict, S1502 is returned to continue monitoring. When there is a conflict, S1504 is continued to detect whether the gesture function has a standby gesture in the OS.

When there is a standby gesture (determined as yes in S1504), S1506 is performed: Enable the standby gesture of the OS, and prompt the user.

When there is no standby gesture (determined as no in S1504), S1505 is performed: The mobile phone 100*a* prompts the user to set a standby gesture of the OS.

For example, in this embodiment, if the gestures supported by the OS and the app of the mobile phone 100*a* are still shown in Table 1, a gesture 1701 "slide left from the right edge" shown in FIG. 17 is a conflicted gesture, and a function defined by the gesture 1701 in the OS is "back", and a function defined in Books is "next page". When the user operates the gesture, the mobile phone 100*a* may monitor a gesture conflict.

Figure 18:
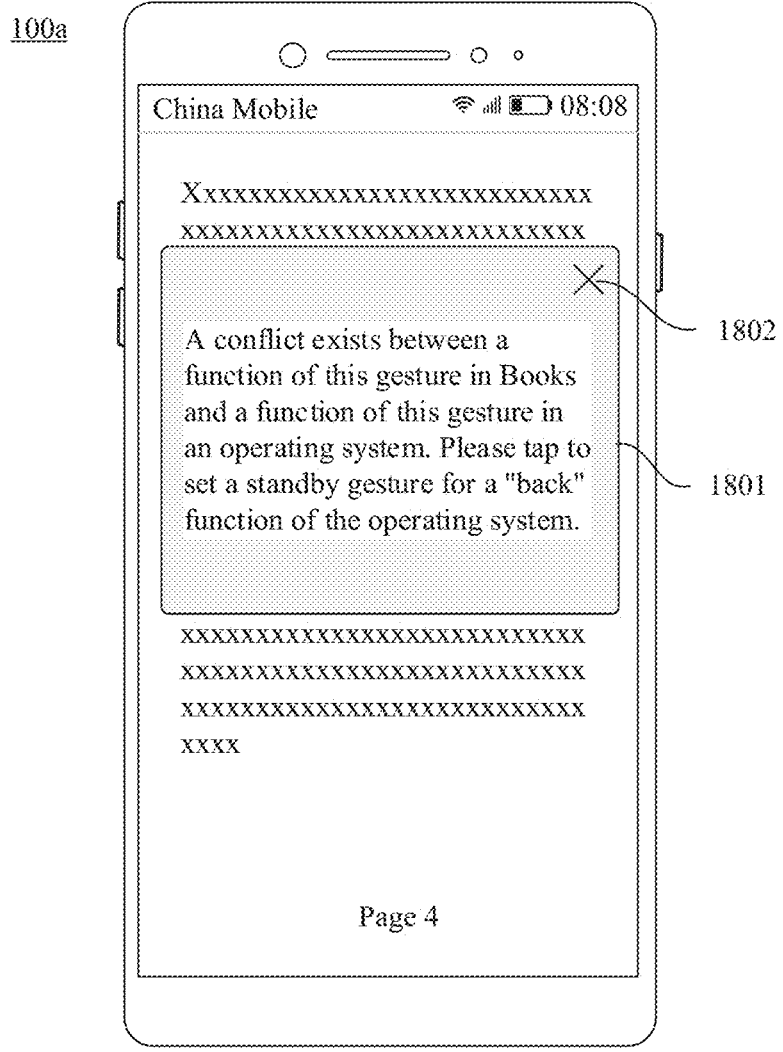
FIG. 18 shows an example of a UT on which prompt information is popped up after a mobile phone determines that a gesture of an opened app conflicts with a default gesture of an OS.

In this case, prompt information 1801 may be popped up on the current UI interface, to prompt the user that the gesture conflicts between Books and the OS, and ask the user to set a standby gesture for the "back" function of the operating system, as shown in FIG. 18. The user may tap the pop-up prompt information 1801 in FIG. 18 to enter a standby gesture setting interface. An example of the standby gesture setting interface is shown in FIG. 13. After entering the standby gesture setting page, the user may select a standby gesture provided by the system, for example, select 1301 "slide up from the right edge" or 1302 "touch and hold the lower right corner" shown in FIG. 13, or perform customization 1303 on the "back" gesture. In some implementations, the user may be prompted in a manner other than by popping up the window shown in FIG. 18, for example, by using a notification bar, or by displaying a text, an animation, or an image on a blurred background.

Refer to FIG. 18 again. When the user considers that a standby gesture does not need to be set, the user may directly tap a pop-up close button 1802, to skip standby gesture setting. For example, in some embodiments, Books defines a gesture corresponding to the "back" function. In this case, the user does not need to additionally set a standby gesture for the "back" function, but may directly use the gesture defined by Books.

After the user sets the standby gesture, S1506 continues to be performed: The system enables the standby gesture of the OS and notifies the user.

Figure 19:
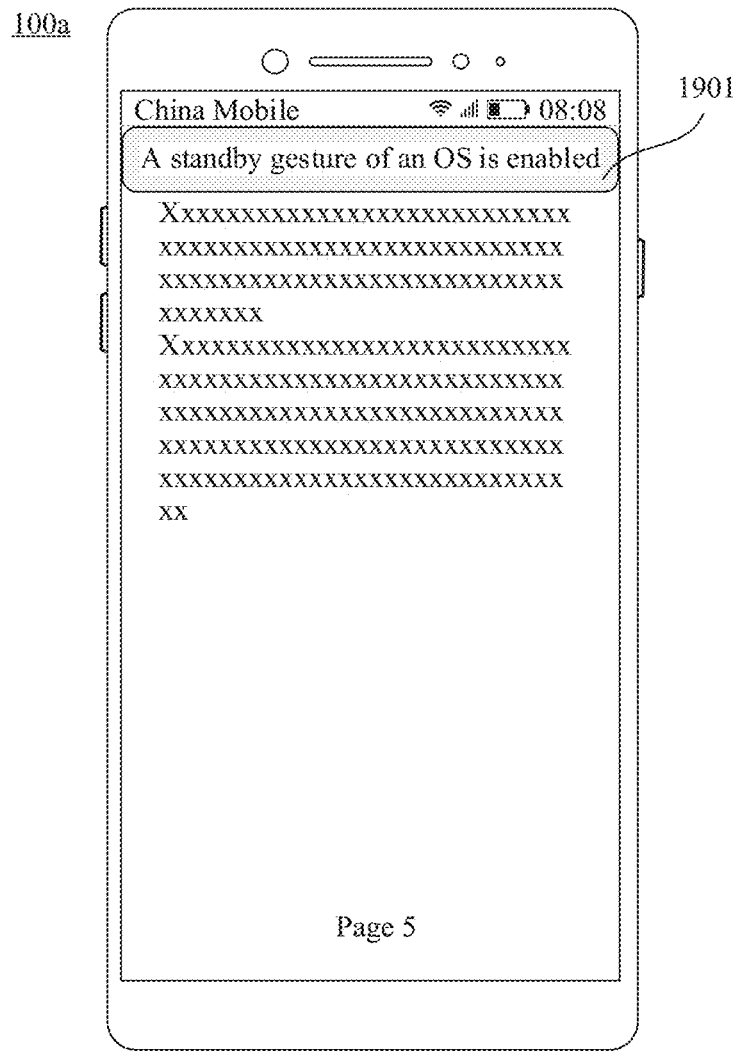
FIG. 19 shows an example of a UT on which a system enables a standby gesture of an OS and notifies a user after the standby gesture is set.

For example, as shown in FIG. 19, the mobile phone 100*a* may turn, in response to the "next page" function corresponding to the gesture "slide left from the right edge"

defined by Books, a page 4 shown in FIG. 18 to a page 5 shown in FIG. 19, and display notification information in a notification bar 1901 above the UI interface of Books, to notify the user that the standby gesture of the OS is enabled. In some implementations, the user may learn detailed information, manage a gesture, or the like in a manner such as pulling down the notification bar 1901. This is similar to FIG. 6. Details are not described herein again.

After the standby gesture is enabled, when the user executes the conflicted gesture again, the corresponding function of the app is implemented in response to the conflicted gesture, but the corresponding function of the original OS cannot perform responding. However, the corresponding function of the OS may be implemented by using the standby gesture. For example, in the interface of the page 5 of the "book 1", if the user uses the conflicted gesture 801 "slide left from right edge" shown in FIG. 8A, the function response of Books takes effect, and the book is turned to a next page (that is, turn from the page 5 shown in FIG. 8A to the page 6 shown in FIG. 8B). However, if the user performs the gesture 901 "slide up from the right edge" shown in FIG. 9A on the page 5, the OS performs the "back" function in response to the gesture (that is, back from the content on the page 5 shown in FIG. 9A to the bookshelf interface of Books shown in FIG. 9B).

According to some embodiments of this application, the standby gesture set by the user in S1505 may be stored in the mobile phone 100a, so that the standby gesture can be directly used without being set again when a same gesture conflict occurs in a subsequent use process of the app or another app. However, according to some other embodiments of this application, the standby gesture may alternatively not be stored, but the user is prompted to set a standby gesture each time a conflict occurs.

According to some embodiments of this application, standby gestures may also be set in advance for all gestures supported by the OS, to fully avoid gestures supported by various apps, as shown in Table 2.

When the standby gesture has been set in advance for the conflicted gesture monitored in S1503, the operations in S1504 and S1505 may be skipped, and S1506 is directly performed: Enable the standby gesture and notify the user.

Subsequently, the monitoring operation in S1502 is returned. In some implementations, the mobile phone may continuously monitor the gesture operation event in the entire use process of the app, to process a gesture conflict at any time.

S1507: The mobile phone detects exit of the current app, and after the current app is exited (for example, the home screen is returned to, or another app is switched), S1508 continues to be performed: Disable the system standby gesture, and prompt the user. Otherwise, the gesture operation event is continuously monitored.

For example, after the mobile phone 100a returns from the bookshelf interface shown in FIG. 9B to the home screen shown in FIG. 10A, the notification information may be displayed in the notification bar 1001 above the home screen, to notify the user that the standby gesture is disabled. In this case, if the user executes the standby gesture 1002 "slide up from the right edge" in the manner shown in FIG. 10B, the system does not perform responding.

Figure 20:
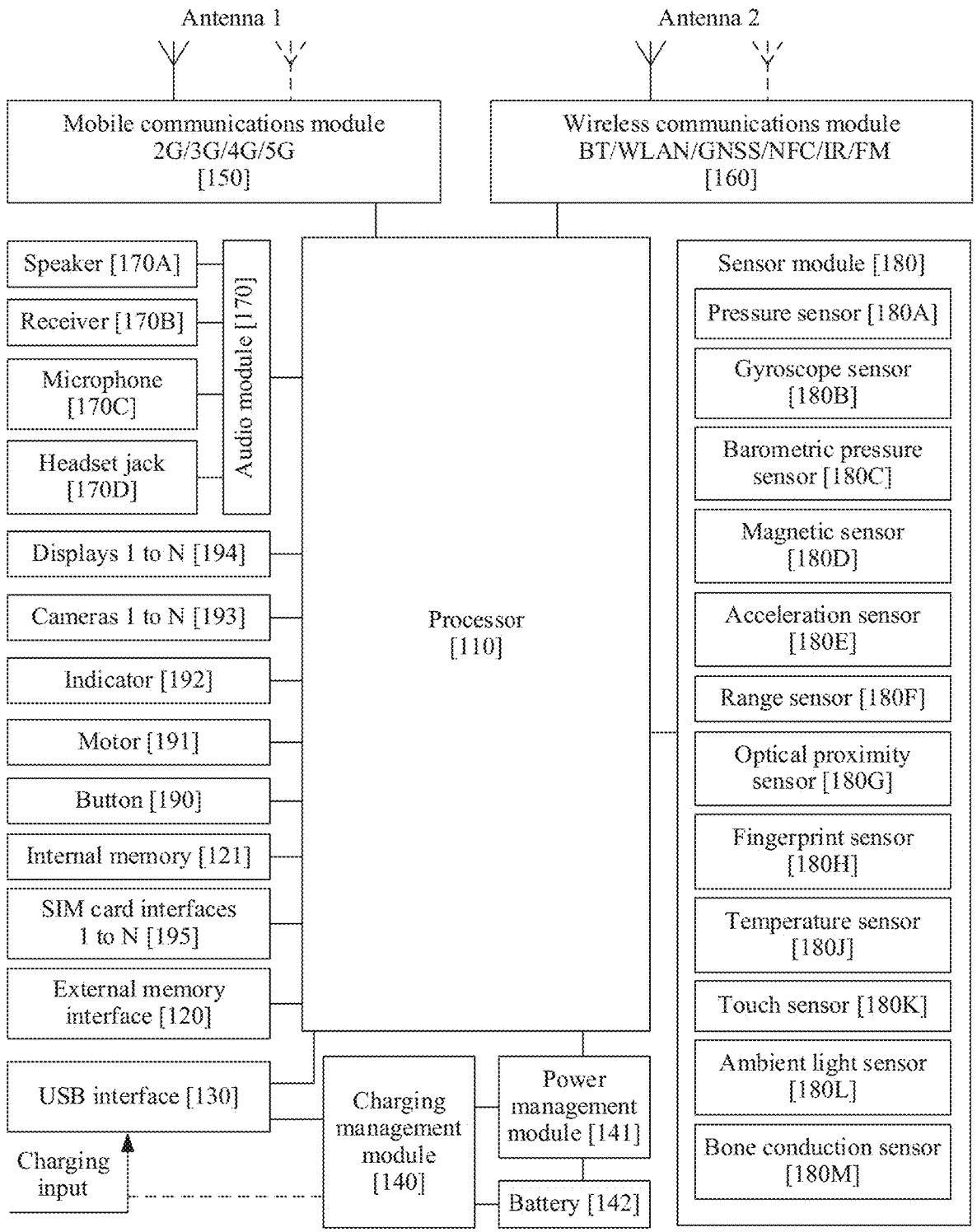
FIG. 20 is a schematic diagram of a structure of a terminal device 100 according to an embodiment of this application.

The foregoing describes, with reference to FIG. 15 and the like, an example of the gesture conflict resolution method when a gesture supported by the app is not pre-stored or known. In the method, the standby gesture of the OS is also set, so that in the scenario in which the gesture of the OS conflicts with the gesture of the app, the user can still the gesture functions of the OS and the app to perform responding, FIG. 20 is a schematic diagram of the structure of the terminal device 100 according to an embodiment of this application.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 1701, a sensor module 180, a button 190, a motor 191, an indicator 192, a camera 193, a display 194, a subscriber identity module (subscriber identity module. SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that, the structure illustrated in this embodiment of this application does not constitute a specific limitation on the terminal device 100, In some other embodiments of this application, the terminal device 100 may include more or fewer parts than those shown in the figure, or combine some parts, or split some parts, or have different component arrangements. The components shown in the figure may be implemented by hardware, software, or a combination of software and hardware.

The processor 110 may include one or more processing units. For example, the processor 110 may include an application processor (Application processor. AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit, NPU). Different processing units may be independent devices, or may be integrated into one or more processors.

The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus. USB) interface, and/or the like.

It can be understood that an interface connection relationship between the modules illustrated in embodiments of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from a charger. The power management module 141 is configured to connect to the battery 142, the charging management module 140, and the processor 110. The power management module 141 receives an input of the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance).

A wireless communication function of the terminal device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals.

The mobile communications module 150 can provide a solution, applied to the terminal device 100, to wireless communication including 2G, 3G, 4G, 5G, and the like.

The wireless communications module 160 may provide a solution, applied to the terminal device 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like.

In some embodiments, in the terminal device 100, the antenna 1 and the mobile communications module 150 are coupled, and the antenna 2 and the wireless communications module 160 are coupled, so that the terminal device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access, TD-SCDMA), long term evolution (long term evolution, LTE), BT, a GNSS, a WIAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal device 100 implements a display function by using the GPU, the display 194, the application processor, and the like. The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, OLED), or the like. In some embodiments, the terminal device 100 may include one or N displays 194, where N is a positive integer greater than 1.

The terminal device 100 may implement a photographing function by using the ISP, the camera 193, the video codec, the GPU, the display 194, the application processor, and the like.

The external memory interface 120 may be configured to connect to an external memory card, for example, a micro SD card, to extend a storage capability of the terminal device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data and a phone book) and the like created when the terminal device 100 is used. In addition, the internal memory 121 may include a high-speed random access memory, or may include a nonvolatile memory such as at least one disk storage device, a flash memory, or a universal flash storage (universal flash storage, UFS). The processor 110 runs instructions stored in the internal memory 121 and/or instructions stored in the memory disposed in the processor, to perform various function applications of the terminal device 100 and data processing.

The terminal device 100 may implement an audio function such as music playing or recording by using the audio module 170, the speaker 170A, the receiver 170B, the microphone 170C, the headset jack 170D, the application processor, and the like.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. The display 194 may provide a visual output related to the touch operation. In some other embodiments, the touch sensor 180K may alternatively be disposed on a surface of the terminal device 100 at a location different from that of the display 194.

The button 190 includes a power button, a volume button, and the like. The button 190 may be a mechanical button, or may be a touch button. The terminal device 100 may receive a key input, and generate a key signal input related to a user setting and function control of the terminal device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

According to some embodiments of this application, a software system of the terminal device 100 may use a layered architecture, an event-driven architecture, a microkernel architecture, a microservice architecture, or a cloud architecture. In this embodiment of this application, an Android system of a layered architecture is used as an example to illustrate the software structure of the terminal device 100.

Figure 21:
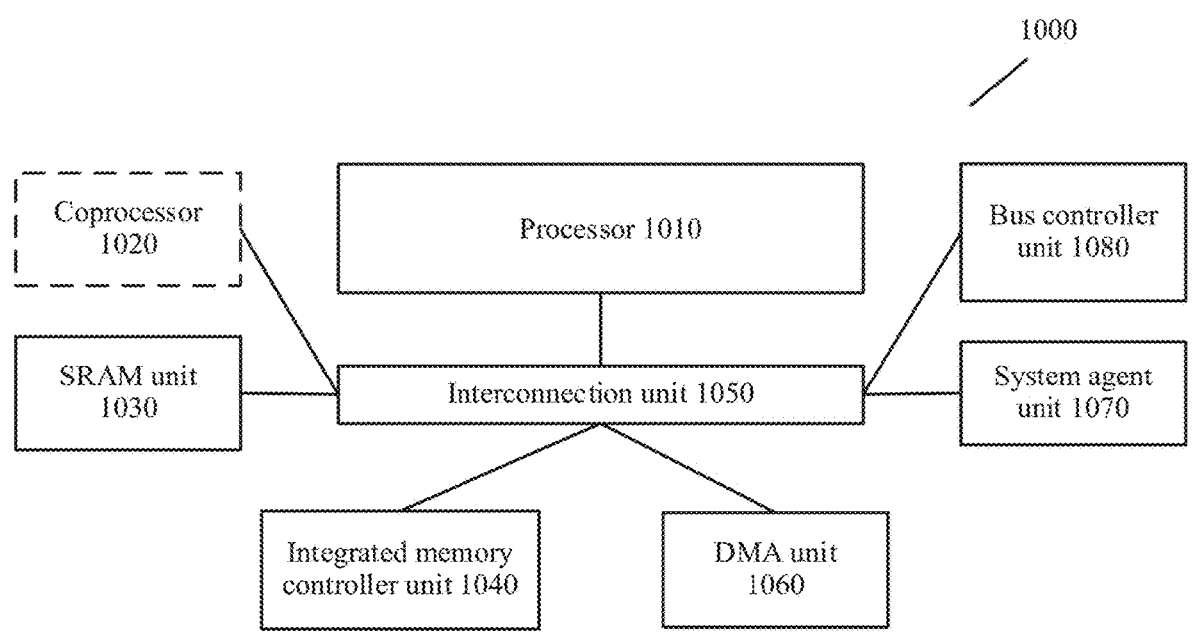
FIG. 21 is a block diagram of a system on chip (SoC) according to an embodiment of this application.

According to an embodiment of this application, FIG. 21 is a block diagram of an SoC (System on Chip, system on chip) 1000. In FIG. 21, a dashed block is an optional feature of the SoC. In FIG. 21, the SoC 1000 includes an interconnection unit 1050 that is coupled to an application processor 1010, a system agent unit 1070, a bus controller unit 1080, an integrated memory controller unit 1040, one group of coprocessors 1020 or one or more coprocessors 1020 that may include integrated graphics logic, an image processor, an audio processor, and a video processor, a static random access memory (SRAM) unit 1030, and a direct memory access (DMA) unit 1060. In an embodiment, the coprocessor 1020 may include a dedicated processor, for example, a network or communications processor, a compression engine, a GPGPU, a high throughput/throughout MIC processor, or an embedded processor.

Embodiments disclosed in this application may be implemented in hardware, software, firmware, or a combination of these implementation methods. Embodiments of this application may be implemented as a computer program or program code executed in a programmable system. The programmable system may include at least one processor, a storage system (including a volatile memory, a nonvolatile memory, and/or a storage element), at least one input device, and at least one output device.

The program code may be used to input instructions, to perform functions described in this application and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented by using a high-level programming language or an object-oriented programming language, to communicate with the processing system. The program code may also be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. The disclosed embodiments may alternatively be implemented in a form of instructions or programs carried or stored on one or more transient or non-transient machine-readable (for example, computer-readable) storage media, and the instructions or the programs may be read and executed by one or more processors or the like. When the instructions or the programs are run by a machine, the machine may perform the foregoing various methods. For example, the instructions may be distributed through a network or another computer-readable medium. Therefore, the machine-readable medium may include but is not limited to any mechanism used to store or transmit information in a machine for example, computer)-readable form, for example, a floppy disk, a compact disc, a compact disc read-only memory (CD-ROM), a magnetic disc, a read-only memory (ROM), a random access memory (RAM), an erasable programmable read-only memory (EPROM), an electronically erasable programmable read-only memory (EEPROM), a magnetic card, an optical card, a flash memory used to transmit network information by using an electrical signal, an optical signal, an acoustic signal, or another form of signal (for example, a carrier, an infrared signal, or a digital signal), or a tangible machine-readable tumors. Therefore, the machine-readable medium includes any form of machine-readable medium that is suitable for storing or transmitting electronic instructions or machine (for example, computer)-readable information.

Therefore, embodiments of this application further include a non-transient tangible machine-readable medium. The medium includes instructions or design data, for example, a hardware description language (HDL), and defines a structure, a circuit, an apparatus, a processor, and/or a system feature described in this specification. These embodiments are also referred to as program products.

It should be understood that although terms such as "first" and "second" may be used herein to describe various features, these features should not be limited by these terms. These terms are merely used for distinction, and shall not be understood as an indication or implication of relative importance. For example, without departing from the scope of example embodiments, a first feature may be referred to as a second feature, and similarly the second feature may be referred to as the first feature.

Furthermore, various operations will be described as a plurality of separate operations in a manner that is most conducive to understanding illustrative embodiments. However, a described sequence should not be construed as implying that these operations need to depend on the described sequence. A plurality of these operations may be performed in parallel, concurrently, or simultaneously. In addition, the sequence of the operations may be further rearranged. The processing may be terminated when the described operations are completed, but may also have additional operations not included in the figures. The processing may correspond to a method, a function, a procedure, a subroutine, a subprogram, or the like.

References to "an embodiment", "embodiments", "an illustrative embodiment", and the like in the specification indicate that the described embodiment may include a specific feature, structure, or property, but each embodiment may or may not necessarily include the specific feature, structure, or property. In addition, these phrases are not necessarily intended for a same embodiment. In addition, when specific features are described with reference to specific embodiments, knowledge of a person skilled in the art can affect combination of these features with other embodiments, regardless of whether these embodiments are explicitly described.

Unless otherwise stated, terms "contain", "have", and "include" are synonymous. A phrase "A/B" indicates "A or B". A phrase "A and/or B" indicates "(A), (B), or (A and B)".

As used herein, the term "module" may refer to being a part thereof, or include a memory (a shared memory, a dedicated memory, or a group memory) for running one or more software or firmware programs, an application-specific integrated circuit (ASIC), an electronic circuit and/or a processor (a shared processor, a dedicated processor, or a group processor), a combined logic circuit, and/or another suitable component that provides the function.

In the accompanying drawings, some structure or method features may be shown in a specific arrangement and/or order. However, it should be understood that such a specific arrangement and/or order is not required. In some embodiments, these features may be described, in a manner and/or order different from that shown in the descriptive accompanying drawings. In addition, structure or method features included in a specific accompanying drawing do not mean that all embodiments need to include such features. In some embodiments, these features may not be included, or these features may be combined with other features.

Embodiments of this application are described above in detail with reference to the accompanying drawings. However, use of the technical solutions of this application is not limited to various applications mentioned in embodiments of this application, and various structures and variations may be easily implemented with reference to the technical solutions of this application, to achieve various beneficial effects mentioned in this specification. Without departing from the purpose of this application, any variation made within the scope of knowledge possessed by a person of ordinary skill in the art shall fall within the scope of this application.

What is claimed is:

1. A method comprising:
   starting an application;
   comparing a first gesture supported by the application with a default gesture of an operating system of a terminal device;
   enabling a standby gesture for the default gesture when a conflict exists between the first gesture and the default gesture, wherein enabling the standby gesture comprises providing a gesture that is different than the default gesture and that supports an operation corresponding to the default gesture;
   setting a pre-monitor of a gesture operation event before the gesture operation event has transferred to the application;
   setting a post-monitor of the gesture operation event after the gesture operation event has transferred to the application;
   detecting, in the pre-monitor, that a second gesture in the gesture operation event is the default gesture;
   detecting no default gesture in the post-monitor; and
   detecting that the conflict exists in response to the pre-monitor and the post-monitor.

2. The gesture operation method of claim 1, further comprising:
   obtaining the first gesture and the default gesture,
   wherein the conflict exists when a third gesture that is the same as the default gesture exists in the first gesture.

3. The method of claim 1, further comprising obtaining, from a server, a result indicating that the conflict exists between the first gesture and the default gesture.

4. The method of claim 1, wherein before starting the application, the method further comprises setting the standby gesture for the default gesture.

5. The method of claim 1, wherein after starting the application, the method further comprises setting the standby gesture for the default gesture.

6. The method of claim 1, further comprising storing third gestures supported by the application, wherein the third gestures comprise:
   a fourth gesture obtained by detecting the application; and
   a fifth gesture that is supported by the application and that is received from a server.

7. The method of claim 1, further comprising:
   detecting an exit of the application; and
   disabling the standby gesture in response to detecting the exit of the application.

8. The method of claim 7, further comprising:
   enabling the standby gesture; and
   prompting a user that the standby gesture is enabled in response to enabling the standby gesture.

9. The method of claim 1, further comprising:
   detecting a first input of a user on the application, wherein the first input corresponds to the first gesture; and
   executing a first operation corresponding to the first gesture.

10. The method of claim 9, further comprising:
    detecting a second input of the user on the application, wherein the second input corresponds to the standby gesture; and
    executing a second operation corresponding to the standby gesture.

11. A computer program product comprising computer-executable instructions that are stored on a non-transitory computer-readable medium and that, when executed by one or more processors, cause a terminal device to:
    start an application;
    compare a first gesture supported by the application with a default gesture of an operating system of the terminal device
    enable a standby gesture for the default gesture when a conflict exists between the first gesture and the default gesture, wherein enabling the standby gesture comprises providing a gesture which is different than the default gesture and which supports an operation corresponding to the default gesture;
    set a pre-monitor of a gesture operation event before the gesture operation event has transferred to the application;
    set a post-monitor of the gesture operation event after the gesture operation event has transferred to the application;
    detect, in the pre-monitor, that a second gesture in the gesture operation event is the default gesture;
    detect, in the post-monitor, no default gesture; and
    detect that the conflict exists in response to the second gesture being the default gesture in the pre-monitor and the default gesture is not in the post-monitor.

12. A device comprising:
    a memory configured to store instructions; and
    one or more processors coupled to the memory and configured to execute the instructions to cause the device to:
    start an application;
    compare a first gesture supported by the application with a default gesture of an operating system of the device;
    enable a standby gesture for the default gesture when a conflict exists between the first gesture and the default gesture, wherein enabling the standby gesture comprises providing a gesture which is different than the default gesture and which supports an operation corresponding to the default gesture;

set a pre-monitor of a gesture operation event before the gesture operation event has transferred to the application;
set a post-monitor of the gesture operation event after the gesture operation event has transferred to the application;
detect, in the pre-monitor, that a second gesture in the gesture operation event is the default gesture;
detect, in the post-monitor, no default gesture; and
detect that the conflict exists in response to the second gesture being the default gesture in the pre-monitor and the default gesture is not in the post-monitor.

13. The device of claim 12, wherein the one or more processors are further configured to execute the instructions to cause the device to:
obtain the first gesture and the default gesture; and
further detect that the conflict exists when the second gesture that is the same as the default gesture exists in the first gesture.

14. The method of claim 1, wherein before starting the application, the method further comprises prompting a user to set the standby gesture for the default gesture.

15. The method of claim 1, wherein after starting the application, the method further comprises prompting a user to set the standby gesture for the default gesture.

16. The method of claim 7, further comprising:
disabling the standby gesture; and
prompting a user that the standby gesture is disabled in response to disabling the standby gesture.

17. The computer program product of claim 11, wherein the instructions, when executed by the one or more processors, cause the terminal device to, before starting the application, set the standby gesture for the default gesture.

18. The computer program product of claim 11, wherein the instructions, when executed by the one or more processors, cause the terminal device to store third gestures supported by the application, wherein the third gestures comprise:
a fourth gesture obtained by detecting the application; and
a fifth gesture that is supported by the application and that is received from a server.

19. The computer program product of claim 11, wherein the instructions, when executed by the one or more processors, cause the terminal device to:
detect an exit of the application; and
disable the standby gesture in response to detecting the exit of the application.

20. The computer program product of claim 11, wherein the instructions, when executed by the one or more processors, cause the terminal device to:
disable the standby gesture; and
prompt a user that the standby gesture is disabled in response to disabling the standby gesture.

\* \* \* \* \*

UNITED STATES PATENT AND TRADEMARK OFFICE
CERTIFICATE OF CORRECTION

PATENT NO. : 12,159,149 B2
APPLICATION NO. : 18/002373
DATED : December 3, 2024
INVENTOR(S) : Chuanfeng Chen Page 1 of 1

It is certified that error appears in the above-identified patent and that said Letters Patent is hereby corrected as shown below:

In the Claims

Claim 2, Column 21, Line 54: "The gesture operation method of" should read "The method of"

Signed and Sealed this
Twenty-eighth Day of January, 2025

Coke Morgan Stewart
*Acting Director of the United States Patent and Trademark Office*